United States Patent [19]
Knowlton et al.

[11] Patent Number: 6,141,006
[45] Date of Patent: Oct. 31, 2000

[54] METHODS FOR EXECUTING COMMERCIAL TRANSACTIONS IN A NETWORK SYSTEM USING VISUAL LINK OBJECTS

[75] Inventors: Kenneth Charles Knowlton, Merrimack, N.H.; Gary Steven Miliefsky, Tyngsborough, Mass.

[73] Assignee: QuickBuy, Inc., Acton, Mass.

[21] Appl. No.: 09/478,449

[22] Filed: Jan. 5, 2000

Related U.S. Application Data

[63] Continuation of application No. 09/248,653, Feb. 11, 1999, Pat. No. 6,061,057.

[51] Int. Cl.$^7$ .................................................. G06F 17/60
[52] U.S. Cl. ........................................ 345/335; 705/26
[58] Field of Search .................................... 345/329, 333, 345/334, 335, 348, 349, 356, 357, 969; 705/26, 27; 707/104, 513, 515, 516, 522, 523, 524; 709/203, 217, 218

[56] References Cited

U.S. PATENT DOCUMENTS

| | | | |
|---|---|---|---|
| 5,740,549 | 4/1998 | Reilly et al. | 705/14 |
| 5,781,189 | 7/1998 | Holleran et al. | 345/335 |
| 5,799,157 | 8/1998 | Escallon | 705/27 |
| 5,864,827 | 1/1999 | Wilson | 705/35 |
| 5,870,717 | 2/1999 | Wiecha | 705/26 |
| 5,890,175 | 3/1999 | Wong et al. | 707/505 |
| 5,897,622 | 4/1999 | Blinn et al. | 705/26 |

*Primary Examiner*—Crescelle N. dela Torre
*Attorney, Agent, or Firm*—G. D. Clapp, Esq.

[57] ABSTRACT

Apparatus and methods for executing business transactions and transferring subscribed for and periodically updated information across networks by means of encapsulated, self contained visual link objects that include a displayable image representing the contents of the visual link object, a dataset forming the contents of the object, and additional information wherein the contents of a visual link object are determined by the nature of an intended transaction or the nature of the information to be distributed. Also described are apparatus and methods for creating and distributing graphical user interfaces for application programs, for customization of applications programs, and methods for multi-level encapsulation of visual link objects to protect the contents thereof from unauthorized access, together with alternate implementations of visual link objects.

13 Claims, 16 Drawing Sheets

| | |
|---|---|
| EPV | Private product information |
| EPU | Public product information |
| ESK | Stock Keeping Unit |
| EBC | BarCode Information |
| EMN | Model Number |
| ESN | Serial Number |
| EDS | Product description |
| EWR | Warrantee information |
| EWV | Volume and/or Weight information |
| EQT | Quantity information |
| ESI | Shipping information |
| EPR | Price |
| ESH | Shipping and Handling Cost |
| ETX | Tax information |
| EPS | States company has presence in |
| EPL | Location of HTTPS POST to purchase product |

FIG. 2A

| SHORT KEY | Database Field | Description |
|---|---|---|
| EFN | eFirstName | Customer or owner's first name |
| ELN | eLastName | Customer or owner's last name |
| EMN | eMiddleName | Customer or owner's middle name |
| EBA1 | eBillToAddress1 | Billing address to fulfill order |
| EBA2 | eBillToAddress2 | Billing address to fulfill order |
| EBTC | eBillToCity | Billing address city to fulfill order |
| EBTS | eBillToState | Billing address state to fulfill order |
| EBTP | eBillToPostalCode | Billing address postal code to fulfill order |
| EBTCOU | eBillToCountry | Billing address country to fulfill order |
| EBTCOM | eBillToCompany | Billing address company to fulfill order |
| EAN | eAccountNumber | Customer's account number |
| ECM | eContactMethod | Preferred method of contact (TEL, FAX, E-MAIL, US MAIL, etc.) |
| ECL | eCreditLimit | Customer's credit limit (eg. If this is a VLO of their credit card, it would be the limit on this card) |
| ECT | eCreditTerms | Customer's terms for payment (IMMEDIATE, NET 30, etc.) |
| ECC | eCreditCity | Customer's credit card bank's address |
| ECCC | eCreditCardCountry | Customer's credit card bank's address |
| ECCBN | eCreditCardBankName | Customer's credit card bank's name |
| ECCBT | eCreditCardBankTelephone | Customer's credit card bank's telephone |
| ECCED | eCreditCardExpirationDate | Customer's credit card bank's expiration date |
| ECCN | eCreditCardNumber | Customer's credit card number |
| ECCT | eCreditCardType | Customer's credit card type (VISA, MASTER, DISCOVER, AMEX, DINERS, etc.) |
| EMH | eMailHome | Customer's home e-mail address |

FIG. 2B-1

| | | |
|---|---|---|
| EMO | eMailOffice | Customer's office e-mail address |
| EUID | eUserId | Customer's userid |
| EPWD | ePassword | Customer's userid |
| EPM | ePaymentMethod | Product payment method's accepted by merchant |
| ESTFN | eShipToFirstName | Person's first name for order fulfillment/shipping to |
| ESTLN | eShipToLastName | Person's last name for order fulfillment/shipping to |
| ESTMN | eShipToMiddleName | Person's middle name for order fulfillment/shipping to |
| ESTA1 | eShipToAddress1 | Shipping address for order fulfillment |
| ESTA2 | eShipToAddress2 | Shipping address for order fulfillment |
| ESTC | eShipToCity | Shipping address for order fulfillment |
| ESTCOM | eShipToCompany | Shipping address for order fulfillment |
| ESTCOU | eShipToCountry | Shipping address for order fulfillment |
| ESTPC | eShipToPostalCode | Shipping address for order fulfillment |
| ESTS | eShipToState | Shipping address for order fulfillment |
| ETI | eTaxInfo | Product tax table information |
| EFAX | eFax | Customer's fax number |
| EHT | eHomeTelephone | Customer's home number |
| EOT | eOfficeTelephone | Customer's office number |
| EPV | ePrivate | Private product info |
| EPU | ePublic | General Info for customers |
| ESK | eSKU | Stock Keeping Unit |
| EBC | eBarCode | Bar Code Information |
| EMN | eModelNum | Model Number |
| ESN | eSerialNum | Serial Number |
| EDS | eDesription | Product description |
| ECL | eColor | Product Colors Available e.g. for clothing red<SPACE>white<SPACE>blue |
| ESZ | eSize | Product Sizes Available |

FIG. 2B-2

|  |  | e.g. for clothing 6 <SPACE>7<SPACE>8 |
|---|---|---|
| EWR | eWarranty | Warranty Information |
| EWT | eWeight | Weight Information |
| EVL | eVolume | Volume Information |
| EQT | eQuantity | Quantity Information |
| EOR | eOrigin | Shipping Point of Origin |
| EDS | eDestination | Shipping to Destination |
| ESI | eShippingInfo | Shipping Information |
| EPR | ePrice | Price |
| ESH | eShippingHandling | Shipping and Handling Cost |
| ETX | eTax | Tax Information |
| EPM | ePaymentMethod | Method of payments available eg. VISA<SPACE>MASTER<SPACE>DISCOVER<SPACE>AMEX |
| EPR | ePresence | States that company has presence in for tax information eg. MA<SPACE>NH<SPACE>RI |
| EPL | ePurchaseURL | Location for HTTPS POST to Purchase Product: NOTE THIS IS THE MOST IMPORTANT e-Business Object (VLO) data Field |
| EPDA | eDateSaleBegin | Date product is available for sale |
| EPDNA | eDateSaleEnd | Date product is not available for sale |
| EPG | eProductGender | Product gender |
| EPCQA | eQuantityInventory | Quantity of products in inventory |
| EPMNU | eProductManufacturer | Product's manufacturer |
| EPMIN | eProductMinimum | Required minimum order for product purchase |
| EPNAME | eProductName | Product name |
| EPMSRP | eMSRP | Manufacturer's Suggested Retail Price |
| EPPP | eProductPurchasePrice | Product's purchase price |
| EPWP | eProductWholeSalePrice | Product's wholesale price |
| EPSTAT | eProductStatus | Product status (ACTIVE, HOLD, etc.) |
| EPSUP | eProductSupplier | Product supplier (may be different from manufacturer) |
| EPUOM | eProductUnitMeasure | Product Unit Of Measure |

FIG. 2B-3

|  |  | (each, dozen, etc) |
|---|---|---|
| EPUPC | eProductUPC | Product Universal Product Code number |
| EPWID | eProductWidth | Product Width Available (e.g. for clothing such as pants 29<SPACE>31<SPACE>32L etc.) |
| EPNUM | eProductNumber | Product number |
| EONUM | eProductOrderNumber | Ordering number |
| EOSTAT | eProductDeliverStatus | Describes product detail status (DELIVERED, HOLD, PICK, SHIP, etc.) |
| EPRSP | eSpecialServicePrice | Price for special services (e.g. gift wrap) |
| ESSAV | eSpecialServiceType | Types of special services available (SPECIAL DELIVERY, GIFT WRAP, HAND CARRY, etc.) |
| ESSFLG | eSpecialServiceSelected | Flag for special service chosen |
| ERDF1 | eReservedField1 | Reserved field for possible future use |
| ERDF2 | eReservedField2 | Reserved field for possible future use |
| ERDF3 | eReservedField3 | Reserved field for possible future use |
| ERDF4 | eReservedField4 | Reserved field for possible future use |
| ERDF5 | eReservedField5 | Reserved field for possible future use |

FIG. 2B-4

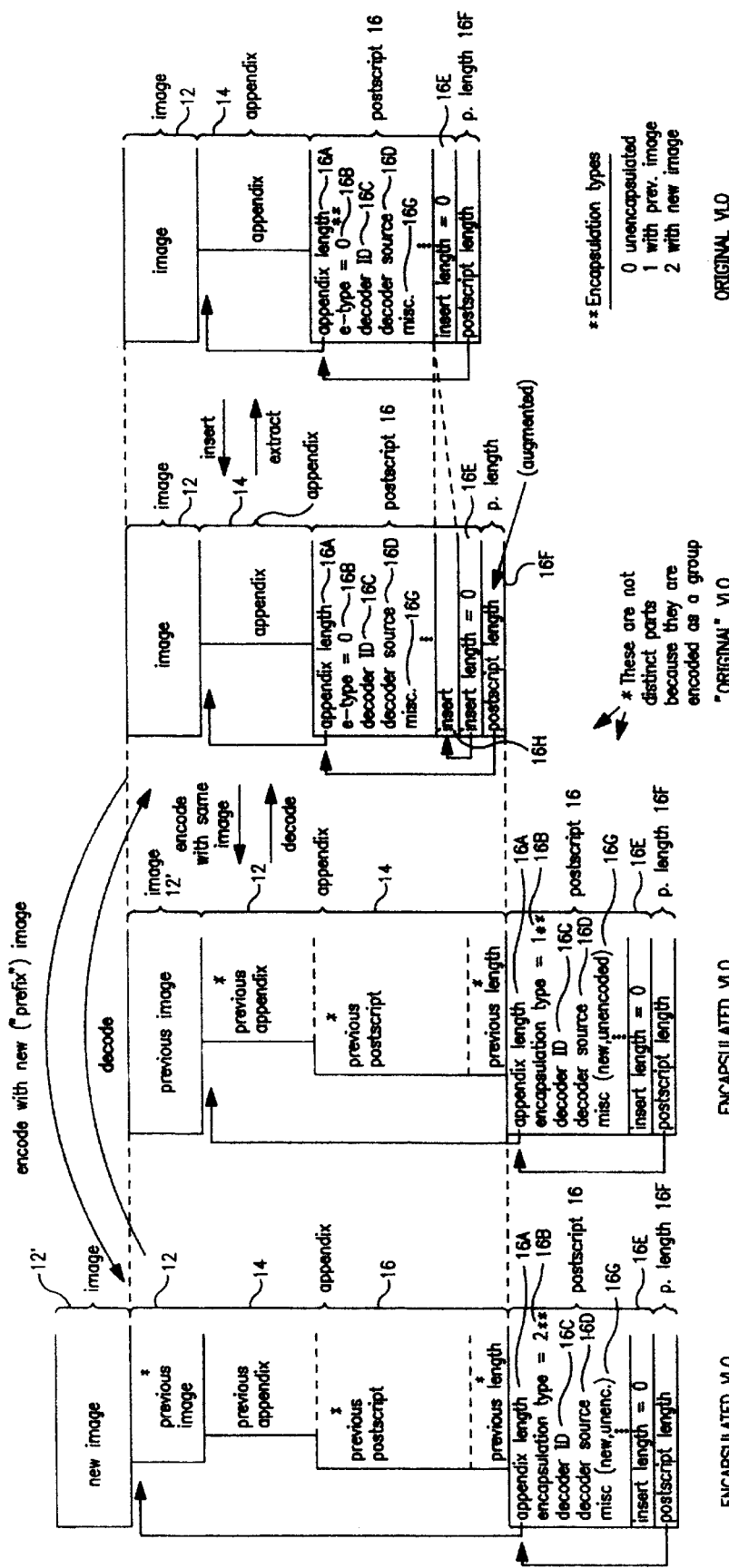

METHODS FOR EXECUTING COMMERCIAL TRANSACTIONS IN A NETWORK SYSTEM USING VISUAL LINK OBJECTS

CROSS REFERENCES TO RELATED APPLICATIONS

The present Patent Application is a Continuation Patent Application of Prior patent application Ser. No. 09/248,563 filed Feb. 11, 1999, now U.S. Pat. No. 6,061,057 and which is incorporated herein by reference.

The present patent application is related and claims benefit of to U.S. patent application Ser. No. 08/814,118, filed Mar. 10, 1997, now U.S. Pat. No. 5,973,692, by Kenneth Charles Knowlton and Gary Steven Miliefsky for A SYSTEM FOR THE CAPTURE AND INDEXING OF GRAPHICAL REPRESENTATIONS OF FILES, INFORMATION SOURCES AND THE LIKE.

FIELD OF THE INVENTION

The present invention relates to a system and method of operation for networked commercial systems and, in particular, to a system and method of operation for network based electronic business systems implemented through the use of visual link objects.

BACKGROUND OF THE INVENTION

Business transactions, that is, the buying and selling of goods and services, have a long history characterized by continuing efforts and developments to facilitate the presentation of goods and services, or at least the knowledge of goods and services, to prospective buyers and the subsequent transfer of goods or services to the buyers and a corresponding transfer of compensation to the seller. The history of such business transactions has been marked by the use of increasing abstractions to represent goods, services and monetary compensation and increasing distance between the seller and the buyer. For example, the first business transactions were by the direct barter of goods or services, and were soon replaced by the trading of goods or services for money, which was an abstraction representing bartered goods and facilitated business dealings as being more flexible and more easily transportable than bartered goods. At about the same time, stores and similar facilities where goods were stocked in anticipation of sales were established, thereby making the goods more readily available to potential buyers, including impulse shoppers. The establishment of banking systems, which soon became international in scope and began to use letters of credit and other abstract representations of money, allowed long distance business transactions without the need for actual physical transfer of money or goods. The more recent development of mass media advertising, including catalogues, and of credit cards, mail systems, telephone systems and networked banking systems have still further facilitated the presentation of goods and services to prospective buyers and the subsequent transfer of goods or services to the buyers and a corresponding transfer of compensation to the seller, frequently without the buyer and the seller having any form of direct contact.

The most recent development in business has been the advent of electronic commerce, which is the execution of business transactions, that is, the presentation of goods or services to a prospective buyer and the subsequent arrangement to transfer goods or services to the buyer and compensation to the seller, over a communications network, such as the Internet or the World Wide Web (WWW) implemented through the Internet.

Possible electronic commerce may include, for example, transactions within enterprises or between an enterprise and a customer, a supplier, a bank or organizations such as the Securities and Exchange Commission or the stock market, the movement of money or credits and debts, or representations thereof, the transfer of information, and home shopping and financial transactions of all forms, and education and entertainment.

It is estimated that by the year 2000 A.D. the total value of the sale of goods and services through the Internet will be on the order of 4.5 to 6 billion dollars and, for this reason, a primary goal and need of the business community is to reduce the frictions and losses of doing business through the Internet. Examples of such may include inefficient market or organization structures, inefficient means for presenting available goods and services to potential customers, inefficient flow of information, that is, information about goods, orders for goods and services and payment for goods and services, and the number and complexity of the steps which must be executed in order to carry out a transaction. All of these factors inhibit interaction and communication between sellers and buyers and thereby the completion of business transactions.

It is apparent that the resolution of certain of these problems, such as inefficient business organizational structures, must generally be solved by the businesses themselves while others, such as the speed and reliability of communication over the Internet or WWW, will be addressed largely by improvements in the basic technology that is used to implement the Internet and the systems communicating through the Internet. Others, however, are a matter of the manner in which business transactions are carried out through the Internet.

For example, each transaction on the Internet presently requires that the buyer transmit a copy of a credit card or debit card number to the selling business where that number is generally stored in those portions of the seller's system that are involved in day to day transactions, which are generally and permanently accessible through the Internet. As such, and although the seller's systems are generally provided with extensive security mechanisms, the security mechanisms and customer information, such as credit and debit card numbers, are vulnerable to any outside party with the knowledge and skills to breach the security mechanisms. As a consequence, business transactions on the Internet are presently considered, in many respects, to be lacking the security necessary for extensive or large transactions.

Another problem with business transactions through the Internet, which are generally conducted through the WWW, which uses visually based Web pages, is that it is difficult to construct and update Web pages, thus inhibiting the presentation of new goods or services, or updates in goods or services or the presentation of special or temporary offers.

In addition, it is often difficult for a seller to construct a Web page that presents all of the information that a buyer might need to make a decision of whether to purchase certain goods or services, so that Web pages offering goods or services either tend to be limited to standard packaged goods, such as books or music CDs, or to require that the prospective buyer already have extensive knowledge of the offered goods or services. In the alternative, Web pages offering more complex goods or services, or goods or services where many informed choices must be made, are so complex and often multi-paged, that the prospective buyer is often frustrated.

Further, and in a related problem arising from the same causes, sellers' Web pages are often different from one another as regards layout and the type of information presented and the form in which the information is presented, even for similar goods and services, and the information and presentation of information on a page often conflicts with other pages by the same seller. As such, a prospective buyer must generally go through an entirely new learning experience with each sellers' pages, and is often confused due to differences from, and misleading similarities with, other sellers' Web pages.

Still further problems arise from the number and complexity of operations and steps that a prospective buyer must execute in order to complete a transaction on the Internet, such as ordering goods from a seller. For example, a buyer is generally required to enter a plenitude of information into a form, which is generally different from seller to seller, for each and every transaction wherein that information may include items such as the buyer's name, address, goods shipping address, credit or debit card number, one or more information items, such as stock numbers, for each item to be purchased, and so on. Not only is this manner of executing a transaction prone to errors, it is slow, tedious, tiring and boring and, as a result, tends to make transactions slow and to inhibit a buyer from purchasing the goods or services. In addition, and although it is not necessarily a negative aspect of placing an order for some buyers, it operates against the interests and selling practices of many sellers by inhibiting impulse purchases.

The present invention provides a solution to these and other problems of the prior art.

SUMMARY OF THE INVENTION

The present invention is directed to apparatus and methods for executing transactions and the transfer of information across networks by means of encapsulated, self contained visual link objects that include a displayable image representing the contents of the visual link object, a dataset forming the contents of the object, and additional information.

In a first aspect, the present invention is directed to a system for executing electronic business transactions wherein the system includes including a server system and a buyer system interconnected and communicating through a network, the server system and the buyer system each including a memory, a processor and a network interface for communicating through the network and the buyer system including a display and a user input. The server system includes a visual link object memory for storing visual link objects representing business transactions wherein the server system is responsive to access of the server system by the buyer system for transmitting the visual link objects to the buyer system, and the buyer system includes a visual link object memory for storing the visual link objects representing business transactions received from the server system wherein the buyer system is responsive to receiving the visual link objects received from the server system for displaying the visual link objects to a user.

According to the present invention, each visual link object is a single selfcontained entity and includes a displayable image representing a business transaction, an appendix containing information relating to the business transaction, and a postscript containing information relating to the visual link object. The appendix of a visual link object includes, in any combination, an encoded data block containing information relating to the purpose and function of the visual link object and to the business transaction represented by the visual link object, an extended markup block containing information relating to the user of the visual link object, a binary object for storing additional information in a selected binary format, and a program invocation block containing information relating to the invocation of programs for performing operations with respect to the visual link object. In one implementation of visual link objects, the appendix of a visual link object includes, at a location near the end of the appendix, a marker field identifying the end of the appendix and, in association with the marker field, an appendix length field containing a value representing the length of the appendix, and the postscript includes a copyright notice. In an alternate implementation, the postscript includes an appendix length field indicating the length of the appendix, and is followed by a postscript length field indicating the length of the postscript. The appendix of a visual link object preferably further includes a checksum field containing a checksum of the bytes of information contained in the displayable image and in the postscript.

In further implementations of the system for executing business transactions, the buyer system further includes a shopper mechanism for displaying the displayable images the visual link objects received from the server system in a first display window and a decoder mechanism responsive to operation of the shopper mechanism for decoding the appendix of a visual link object displayed by the shopper mechanism and providing the information contained therein and pertaining to the business transaction represented by the visual link object to the shopper mechanism and the shopper mechanism is responsive to the business transaction information provided from the visual link object by the decoder mechanism for displaying at least parts of the business transaction information to a user.

The buyer system may further include a financial memory for storing financial information pertaining to the user, including information relating to at least one credit/debit card authorized for use by the user. The shopper mechanism is then responsive to user inputs for selecting a visual link object representing a business transaction, displaying the information contained therein and pertaining to the business transaction represented by the selected visual link object to the user, accepting user inputs representing user generated information pertaining to the business transaction represented by the selected visual link object, selecting financial information pertaining to the user, relating the financial information pertaining to the user with the information from the selected visual link object pertaining to the business transaction represented by the visual link object and the user generated information pertaining to the business transaction represented by the selected visual link object, and transmitting to the server system the financial information, the information selected from the information from the visual link object, and the information generated by the user as necessary to execute the business transaction represented by the visual link object.

The buyer system may also include a screen saver for storing and displaying selected ones of the visual link objects and responsive to a user indication of a screen saver displayed visual link object for relating the financial information pertaining to the user with the information from the indicated visual link object pertaining to the business transaction represented by the visual link object and the user generated information pertaining to the business transaction represented by the selected visual link object, and transmitting to the server system the financial information, the information selected from the information from the indicated visual link object and the information generated by the user as necessary to execute the business transaction represented by the visual link object.

The present invention is also implemented as an information broadcast system for selectively broadcasting information from a server system to a subscription user of a buyer system. In this implementation, the server system includes a broadcaster file memory for storing visual link objects organized into information channels, wherein at least one information channel contains at least one visual link object, each visual link object contains information to be broadcast to a user authorized to receive the information from the corresponding information channel, and the information contained in the visual link objects of each information channel pertains to subject matter that is related by a selected criteria. The server system also includes an updater that includes a subscription memory for storing authorizations of users of the buyer system to receive the visual link objects of channels and is responsive to access of the server system by a buyer system and to an authorization submitted by the buyer system identifying the user to receive the visual link objects of at least one channel for broadcasting the visual link objects of the at least one channel to the buyer system. The buyer system includes a broadcast information access mechanism for accessing the server system through the network and transmitting to the updater an authorization identifying a user as having authorization to receive visual objects of the at least one channel and a visual link viewer for displaying the visual link objects of the at least one channel to the user and for accessing and displaying to the user at least certain of the information contained in the visual link object. In this implementation, each visual link object is a single self-contained entity and includes a displayable image representing the information contained in the visual link object, an appendix containing the information to be broadcast to a user authorized to receive the information, and a postscript containing information relating to the visual link object. In alternate embodiments of the visual link object, the information contained in the appendix of a visual link object may be the information to be broadcast to the authorized user, or information identifying the location in a server system connected from the network of the information to be broadcast to the user. In the latter instance, the broadcast information access system is responsive to the information identifying the location in a server system connected from the network of the information to be broadcast to the user and to a user command to fetch the information to be broadcast to the user for retrieving the information to be broadcast to the user from the identified location.

In further implementations of the information broadcast system, the updater subscription memory may further include a record of broadcasts of visual link objects to users of the buyer system and broadcasts to each user those visual link objects that the user is authorized to receive and that have changed since the last access by the user.

The information broadcast system may also include a facility, which may reside in a seller system, for creating and providing to the server system visual link objects of channels corresponding to a user of the seller system, wherein the server system is responsive to changes in the visual link object contents of the channels corresponding to the user of the seller system for updating the visual link object contents of the channels corresponding to the user of the seller system.

The present invention may also be implemented in a system for distributing graphical user interface definitions for customizing application programs from a server system to a buyer system that are interconnected and communicate through a network. In this implementation, the server system includes a visual link object memory for storing at least one graphical user interface visual link object wherein the server system is responsive to access of the server system by the buyer system for transmitting a graphical user interface visual link object to the buyer system. The buyer system, in turn, includes a graphical user interface support mechanism for reading a definition of graphical user interface functions contained in the graphical user interface visual link object and interfacing with the application program to be customized to provide a graphical user interface for the application program according to the definition of graphical user interface functions contained in the graphical user interface visual link object. According to this implementation of the present invention, a graphical user interface visual link object is a single self-contained entity and includes a displayable image representing a graphical user interface defined in the visual link object, an appendix containing a definition of a graphical user interface, and a postscript containing information relating to the visual link object, and the graphical user interface definition residing in the visual link object appendix includes at least one window index corresponding to a window of the graphical user interface, each window index including at least one control set defining at least one control appearing in the corresponding window, each control set including a key name identifying the control set, and at least one control index identifying a definition of a control appearing in the corresponding window, wherein each control definition includes a field identifying the type of control, a field identifying the function of the control, a field identifying the position of the control in the corresponding window, a field identifying a background shape for the control, a field identifying a background for the control, and a field for storing a current state of the control. The application program, in turn, includes at least one interface routine for interfacing the graphical user interface support mechanism with a routine of the application program relating to a control of the defined graphical user interface.

The system for distributing graphical user interface definitions for customizing application programs may also include graphical user interface design mechanism, which is comprised of a copy of the application program to be provided with a graphical user interface, wherein the application program includes at least one interface routine for interfacing the graphical user interface support mechanism with a routine of the application program relating to a control of the defined graphical user interface, a copy of the graphical user interface support program, a memory accessible to the graphical user interface program for storing a graphical user interface visual link object containing the definition of the graphical user interface to be provided to the application program, a designer facility connected from and interactive with the graphical user interface support program for editing the definition of the graphical user interface contained in graphical user interface visual link object, and a display window for displaying the graphical user interface while being edited by the designer facility.

In yet another aspect, the present invention is directed to a method for encapsulating a visual link object by the steps of encoding the appendix and postscript of the original visual link object by means of a selected encoder, appending the original displayable image to the start of the encoded appendix and postscript of the original visual link object and appending a new postscript to the end of the encoded appendix and postscript of the original visual link object to create an encapsulated version of the original visual link object. The new postscript contains an identifier of a decoder for decoding the encoded appendix and postscript of the original visual link object and an identification of a source for the decoder for decoding the encoded appendix and postscript of the original visual link object, and a new postscript length field containing the length of the new postscript is appended to the encapsulated version of the original visual link object.

An alternate method of encapsulating a visual link object includes the steps of encoding the displayable image, appendix and postscript of the original visual link object by means of a selected encoder, appending a new displayable image to the start of the encoded original displayable image, appendix and postscript of the original visual link object and appending a new postscript to the end of the encoded original displayable image, appendix and postscript of the original visual link object to create an encapsulated version of the original visual link object. The new postscript contains an identifier of a decoder for decoding the encoded appendix and postscript of the original visual link object, an identification of a source for the decoder for decoding the encoded appendix and postscript of the original visual link object, and a new postscript length field containing the length of the new postscript is appended to the encapsulated version of the original visual link object.

DESCRIPTION OF THE DRAWINGS

The foregoing and other objects, features and advantages of the present invention will be apparent from the following description of the invention and embodiments thereof, as illustrated in the accompanying figures, wherein:

FIG. 2A is an exemplary listing of fields of a visual link object;

FIGS. 2B1 through 2B-4 are an exemplary listing of field of a visual link object;

FIG. 4 is a block diagram of a system utilizing visual link objects for the execution of business transactions;

DESCRIPTION OF THE INVENTION

1. Introduction

As summarized above and as will be described in detail in the following, the present invention is directed to visual link objects for communicating information relating to commercial transactions, such as goods or services offered for sale, as well as other forms of information, between two or more users and to systems, such as electronics commerce systems, using visual link objects. The following will first describe the structure and uses of visual link objects, and in particular visual link objects structured for electronic business applications, and will then describe exemplary systems using such visual link objects, such as an electronic business system for the offer and sale of goods and services operating over the Internet. Other forms and applications of visual link objects will then be described, including visual link objects used, for example, for the construction or modification of graphical user interfaces.

Figure 1:
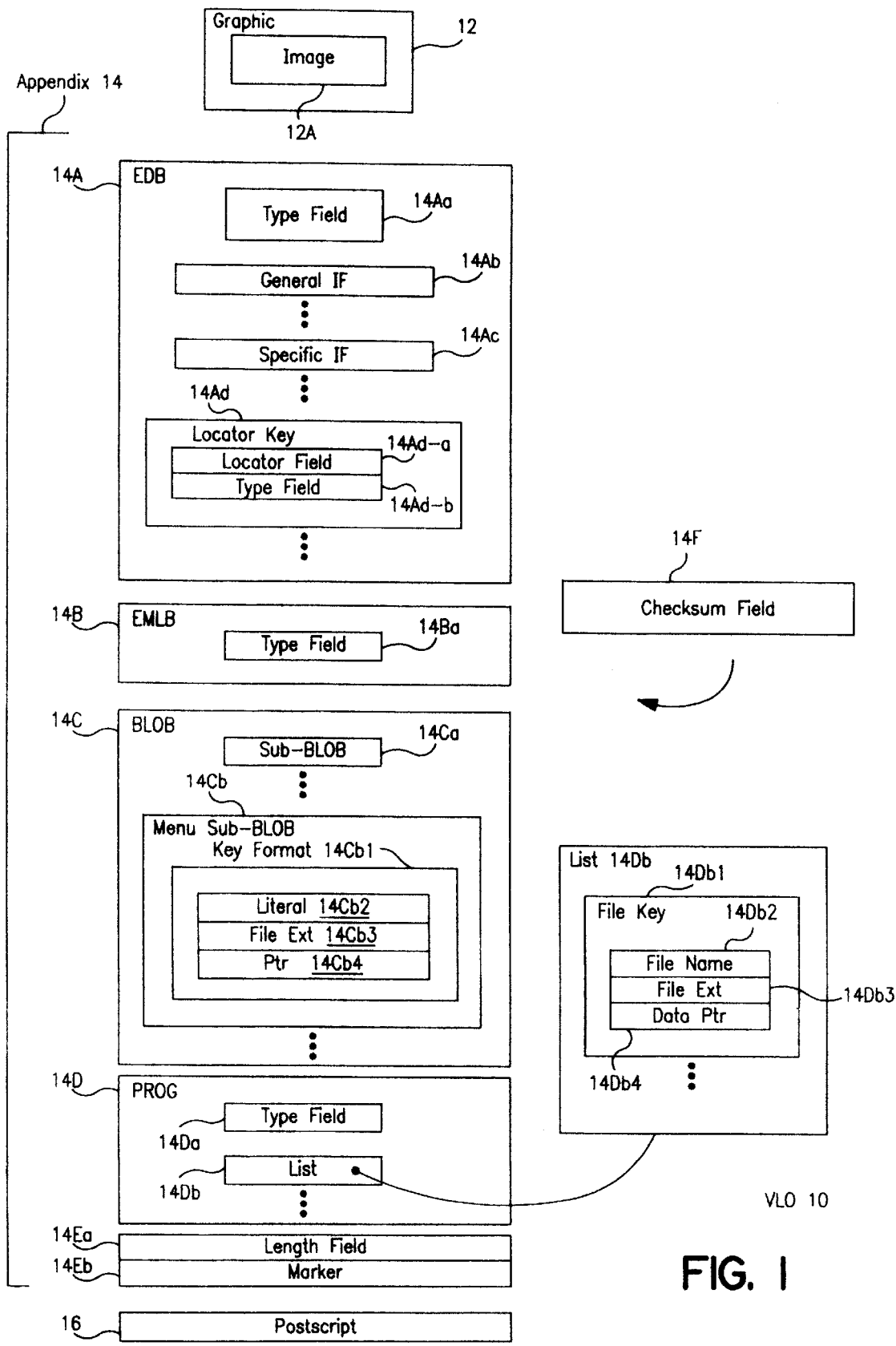
FIG. 1 is a diagrammatic representation of a visual link object of the present invention.

2. Visual Link Objects (FIGS. 1, 2A and 2B)

As will be described, a visual link object is a single, unitary file having a standardized but flexible basic internal structure comprised of two or more parts of differing nature and content. In a presently preferred embodiment, a visual link object includes at least a first part containing a graphic file and a second part that forms an appendix to the graphic file and contains a dataset. The presently preferred embodiment preferably also includes a third part, following the dataset, that contains, for example, a copyright notice. As will also be described below, a visual link object is internally self describing as regards the type or class of data contained in each part of the visual link object and the location or locations of each type or class of data in the visual link object. Visual link objects may thereby contain virtually any form of information in virtually any information format, thus allowing visual link objects to be adapted and used for a wide variety of purposes and functions.

The pictorially displayable aspects of a visual link object, that is, the contents of the graphic part of a visual link object, do not necessarily reflect or represent the actual information contained in the other parts of the visual link object and are not dependent upon the actual information contained therein. As such, a given visual link object is externally neutral as regards the specific functions and purposes of the visual link object. Visual link objects are thereby effectively neutral entities with regard to any system in which they reside and with respect to any program or application that operates with or performs a function with respect to a visual link object that depends only upon the external characteristics of a visual link object, such as displaying the graphic part of a visual link object, storing a visual link object as an entity or transferring or communicating a visual link object as an entity from one location to another.

Visual link objects are of relatively small sizes, presently on the order of 2.5 kilobytes in certain presently preferred implementations, and have the ability to encapsulate information in a manner that is effectively transparent to most systems in which they may reside. Visual link objects may thereby be readily stored, transferred, transmitted, broadcast, e-mailed or otherwise transported across or through virtually any system, such as the Internet. Visual link objects can also readily operate as messengers conveying information between all forms of application programs and systems and for a wide range of purposes and functions.

In this regard, visual link objects will be effectively transparent in most systems in which visual link objects may reside, and most programs in such systems will function normally with regard to visual link objects, that is, will do the "right", desired operations with respect to visual link objects, because, as will be described, visual link objects possess characteristics to cooperate with such normal functions and modes of operation of most systems and programs. Typically, and in most systems and for such operations as copying, filing, e-mailing visual link objects, the length of a file will be understood and tracked by the file systems. Alternately, for some special files, such as text only files, the length of the file will be determined upon encountering a special character referred to as a "end of file" mark. It should be noted, however, that the unique structure of a visual link object wherein different types of data, such as the graphic data of the displayable image and the data of the appendix, such as text, are combined into a single file, may cause inadvertent errors in the operation of a program dealing with a visual link object. For example, the pixel stream of the displayable image may by chance contain a sequence of bits that may be inadvertently read as an "end of file" mark by a program that determines file length by means of "end of file" marks, thereby causing the program to erroneously terminate an operation on the visual link object file. This problem should not in general arise, however, with files presumed to be, or to contain images because images may contain any and all bytes or byte sequences and embedded file marks are therefore in general not used for detecting the ends of such files and thereby understanding the lengths of such files. On the other hand, as concerns the actual display of an image file, such as a .jpg, .bmp or .gif file, the length of the material to be displayed is usually understood from the file header description of the file, which describes such factors as the number of lines to be displayed, the number of pixels in each line and the depth, in number of bits, of each pixel.

Referring to FIGS. 1, 2A and 2B, therein are respectively represented the basic structures of a Visual Link Object (VLO) 10 particularly adapted for use in network based electronic commerce, such as the offer and sale of goods and services operating over the Internet. As will be described, an electronic business VLO 10 which is a small, compact, highly compressed and self contained object that contains and encapsulates an identifying visually displayable graphic and user defined data for use in network based business transactions and operations.

Referring to FIG. 1, and as described above, an electronic business VLO 10 includes a Graphic 12 file for visual display and identification of the electronic business VLO 10, an Appendix 14 containing information specific to the purpose of the electronic business VLO 10 and, in the presently preferred embodiment, a Postscript 16 containing such information as a copyright notice in plain ASCII text format.

As represented in FIG. 1, Graphic 12 resides at the start of an electronic business VLO 10 file and contains a Graphic Image (Image) 12A that is displayable for visual representation and identification of the electronic business VLO 10 to a user. Graphic 12 is comprised of a standard graphic file in any desired standard graphic format, such as the JPEG, TIFF, GIF, bitmap or 24 bit screen capture formats, suitable for representation of Image 12A. Graphic 12 is thereby fully accessible to and readable by any system, utility or application program having the capability of displaying the commonly accepted industry standard graphic file formats and capable of operating with the Graphic 12 file, thereby allowing Image 12A to be visually displayed to a user.

Graphic 12 and the Image 12A may be generated using any graphic generation program, or may be converted or captured and converted from another graphic file. It should be noted that when Image 12A has been captured or converted from another, original graphic file and the Graphic 12 file is of the same type as the original graphic file, this allows the electronic business VLO 10 to be substituted for the original graphic file for the use of most applications that were using the original graphic file.

Next considering Appendix 14 and referring again to FIG. 1, Appendix 14 resides in the electronic business VLO 10 file at any location following the Graphic 12 part of the electronic business VLO 10 file and, as represented in FIG. 1, is preferably located immediately following Graphic 12. As illustrated in FIG. 1, Appendix 14 may include any combination of an Encoded Data Block (EDB) 14A, an Extended Markup Language Block (EMLB) 14B, a Binary Large OBject (BLOB) 14C and a Program Invoke (Prog) 14D. As will be described in further detail below, an Encoded Data Block (EDB) 14A contains standardized information fields specific to the purpose and function of the electronic business VLO 10 while an Extended Markup Language Block (EMLB) 14B contains information particular to a specific user or creator of the electronic business VLO 10 in a standardized format. A Binary Large OBject "Blob" (BLOB) 14C contains additional information in any desired binary format, and BLOB 14C may be comprised of a plurality of sub-BLOBs 14Ca. A Program Invoke (Prog) 14D, in turn, allows the invocation of third party programs, or other programs in the operating environment, such as the application programs normally resident in the Microsoft Windows environment, to operate upon file components contained in one or more of the parts of the electronic business VLO 10.

Referring first to EDB 14A, the data residing in EDB 14A is typically comprised of ASCII or unicode text fields and identifiers, although any other desired form of data may be accommodated, and EDB 14A includes a Type Field 14Aa that contains information identifying the data comprising EDB 14A. The fields of EDB 14A may include both General Information Fields (GeneralIFs) 14Ab relating to the electronic business VLO 10 and Specific Information Fields (SpecificIFs) 14Ac that are specific to the purpose and function of the electronic business VLO 10 and thereby allow a given electronic business VLO 10 to be customized for a specific purpose. EDB 14A thereby allows the addition of "private" data to a electronic business VLO 10 wherein "private" data is data specific or particular to a given creator or user of a electronic business VLO 10. In addition, the information in EDB 14A is preferably encoded, and is thus accessible only to specified users and applications or systems, that is, to those users, applications or systems having the appropriate means for decoding EDB 14A, such as will be described in the following descriptions of a system employing electronic business VLOs 10. In addition, in the presently preferred embodiment, electronic business VLOs 10 are not provided with a programmable interface and, as such, are not revisable after creation. As such, the contents of EDB 14A cannot be read or displayed, even given a system or application capable of reading the data therein, unless specifically given permission and authorization to do so.

Examples of the GeneralIFs 14Ab that may be contained in an EDB 14A are illustrated in FIG. 2A. As shown therein, GeneralIFs 14Ab may include, for example, such information items as Universal Resource Locators (URLs) as used in the Internet and WWW, an identification of the author or creator of the electronic business VLO 10, date information of various types, such as dates of original creation and updating, a company identifier, postal and e-mail addresses, phone numbers, and so on.

Referring to FIG. 2B, therein is presented illustrative examples of SpecificIFs 14Ac that may appear in an electronic business VLO 10, the present example representing SpecificIFs 14Ac constructed for electronic business applications, such as the offering and buying of goods or services over the Internet. It will be seen that FIG. 2B is arranged as a table of three columns wherein each entry in the first column-a contains a mnemonic designation, or short identifier key, of a data field that may appear in SpecificIF 14Ac for business uses, each corresponding entry in the second column contains the name of the data field, and each corresponding entry in the third column contains a brief description of the contents of the data field. It will be noted that although the SpecificIF 14Ac fields of a given type of electronic business VLO 10 may be standardized, the fields are sufficiently extensive to meet the requirements of virtually any application and that the field types may be augmented if necessary for any given application.

Finally, EDB 14A may further include one or more Locator Keys 14Ad, each of which contains a Locator Field 14Ad-a identifying the location of a corresponding sub-BLOB 14Ca and a Type Field 14Ad-b containing an identification of the type of data or information residing in the corresponding sub-BLOB 14Ca. Locator Keys 14Ad may be used generally to identify the location and type of any information or data residing in a sub-BLOB 14Ca of the electronic business VLO 10 and may be used, for example, to associate the data in one or more sub-BLOBs 14Ca with corresponding SpecificIFs 14Ad. For example, a .WAV file containing a sample of music from a music CD may be stored in a sub-BLOB 14Ca and associated with a SpecificIF 14Ad containing an identification of or reference to the music CD so that a prospective buyer can "click" on a visually displayed representation of the SpecificIF 14Ad and listen to the music sample.

Lastly, it will be noted that EDB 14A may be implemented using, for example, 16 bit UNICODE character codes rather than 8 bit ASCII character codes, thereby implementing VLOs 10 for use with languages such as Japanese or Chinese and data sets whose bounds and requirements exceed those of the ASCII character set, or multi-lingual VLOs 10.

Referring again to FIG. 1, EMLB 14B may reside at any location in Appendix 14 but, in the presently preferred embodiment, preferably follows Graphic 12, and is represented in FIG. 1 as immediately following EDB 14A for purposes of illustration. As indicated in FIG. 1, an EMBL 14B includes a Type Field 14Ba containing information identifying the data comprising EMLB 14B. EMLB 14B is typically formed of a structured ASCII or unicode byte stream of letters and numbers and, in the instance of a electronic business VLO 10 constructed for use in electronic business transactions, may typically contain information relevant to the business offering goods or services or to the goods or services themselves, or both. Some portions of EMBL 14B may be accessible, for example, to the prospective buyer, possibly under password control, while other portions may be proprietary to the enterprise offering the goods or services and may be accessible and interpretable only to privileged systems of users internal to the enterprise creating the electronic business VLO 10.

Next considering a BLOB 14C and referring again to FIG. 1, as described above BLOB 14C also resides in Appendix 14 and may be comprised of a plurality of sub-BLOBs 14Ca residing at different locations within the electronic business VLO 10. As described, the location and type of data or information in each sub-BLOB 14Ca in Appendix 14 will be indicated by a Locator Key 14Ad, each of which contains a Locator Field 14Ad-a identifying the location of a corresponding sub-BLOB 14Ca and a Type Field 14Ad-b containing an identifying of the type of data or information residing in the corresponding sub-BLOB 14Ca.

The internal structure of each sub-Blob 14Ca is completely and solely defined by the creator of the electronic business VLO 10, such as the seller of goods and services, and thus has an essentially unrestricted format, but is treated as a binary file. Examples of the data and information that may reside in a sub-BLOB 14Ca include any form of data, such as sound, video or graphics files and encoded data streams for special purposes, such as internal business data, business to business data, and business to public data such as discounts, coupons and special offers for sale. Such data may be accessed as described above, by "clicking" on a corresponding displayed Locator Key 14Ad. Other examples include programs such as ActiveX and Java programs that may be activated, for example, by "clicking", "double clicking", "right button clicking" or "dragging and dropping" the electronic business VLO 10.

Prog 14D also resides in Appendix 14 and includes a Type Field 14Da containing information identifying data files in the electronic business VLO 10 that may be operated upon by third party programs. Such third party programs, which may be referred to as "helper" programs, include programs normally found in the operating environment in which the VLOs 10 reside, such as Microsoft Word in the Microsoft Windows operating environment, and may range from full application programs to small sub-routine type programs capable of performing simple functions.

In this regard, many operating environments, such as Microsoft Windows NT and Windows 95 have the facility that, if a file name with a file extension is identified to the operating environment programs, the operating environment programs will identify the program residing therein that is capable of operating upon files of that type, as identified by the file extension, and will invoke the corresponding program to operate upon the identified file. Prog 14D allows "helper" programs to be invoked to operate upon the corresponding data in the electronic business VLO 10 by identifying such data to the "helper" programs by means of a file name with file extension.

Referring to FIG. 1, Prog 14D will include a List 14Db of File Keys 14Db1, each of which includes a File Name 14Db2 and a File Extension (FileExt) 14Db3, such as VLO.JPG, and a Data Pointer (DataPt) 14Db4 that points to either a file in the electronic business VLO 10 that contains the data, as described above, or to the data residing in electronic business VLO 10, as also described above. By "clicking" on the data, or a reference to the data in the manner described above with regard to Locator Keys 14Ad, the File Name 14Db2 and File Extension 14Db3 will be provided to the operating environment, which will respond by invoking the corresponding program to operate on the data. If the data does not reside in a file, "clicking" on a reference to the data will result in the data being packaged into a file that is assigned the corresponding File Name 14Db2 and FileExt 14Db3, as will be described further in a following discussion, and the File Name 14Db2 and FileExt 14Db3 are then provided to the operating environment programs as just described.

A typical application of Prog 14D would be to provide "right click" sub-menus for the selection of operations to be performed on a component of a electronic business VLO 10. In this instance, and instead of automatically invoking a "helper" program, the file name and extension will result in the display of a menu of possible operations to be performed on the data, the menu and related data being typically stored in a sub-BLOB 14C*a* and identifying the possible operations and corresponding "helper" programs to perform the operations. In a presently preferred embodiment, a "right click" menu is generated automatically and in a manner transparent to a user by a decoder program that decodes and displays electronic business VLOs 10. For this purpose, and as illustrated in FIG. 1, data and information pertaining to each "right click" sub-menu is stored in a corresponding Menu Sub-Blob 14C*b* that contains a Key Format 14C*b*1 that identifies an entry in a right click menu. As shown, the Key Format 14C*b*1 includes a literal string in a Literal 14C*b*2, such as "Play Music", that will be included in the right click menu. The Key Format 14C*b*1 further includes a File Extension (FileEx) 14C*b*3 that indicates to the operating system which helper program to use to execute the right click menu option, and a Pointer (Ptr) 14C*b*4 that may point to another File Key 14D*b*1 that may refer to related binary information. Alternatively, and in the presently preferred embodiment of VLOs 10, "right click" menus are implemented by means of functions in, for example, the VLO 10 decoders, described in a following description, rather than the inherent autogeneration of "right click" menus being provided directly through the VLOs 10. In this instance, Key Formats 14C*b*1 are included in the VLOs 10, but primarily contain pointers to BLOB 14 fields.

Lastly, it will be seen in FIG. 1 that Appendix 14 further includes a Length Field 14E*a* containing a value representing the length, or total number of bits, of information contained in Appendix 14, and a Marker 14E*b* that identifies the associated field as being the Length Field 14E*a*. In the presently preferred embodiment of an electronic business VLO 10, Length Field 14E*a* precedes Marker 14E*b* and the Length Field 14E*a* and Marker 14E*b* reside at the end of Appendix 14 as the last two components of Appendix 14.

As represented in FIG. 1, Postscript 16 preferably resides at or near the end of an electronic business VLO 10, depending upon whether the builder of a VLO 10 chooses to place additional privately defined information in the VLO 10 after the Postscript 16. Postscript 16, however, is the last structurally defined and interpreted component in the presently preferred embodiment of an electronic business VLO 10 and, in the presently preferred embodiment of an electronic business VLO 10, contains at least a copyright notice and may contain other information.

Finally, in the presently preferred embodiment of an electronic business VLO 10 Appendix 14B contains a Checksum Field 14F at a predetermined location relative to the end of Appendix 14B, which as described above is preferably indicated by Marker 14E*b*. Checksum field 14F contains a checksum value on the bytes of information in Graphic 12 and the bytes of Postscript 16 and, as described above, is encoded in the same manner as the remainder of the data residing in an Appendix 14. Checksum Field 14F thereby provides a means for checking that the Graphic 12 and Postscript 16 associated with the Appendix 14 of a given VLO 10 are the Graphic 12 and Postscript 16 associated with the Appendix 14 when the VLO 10 was originally created. Although Checksum Field 14F does not provide an absolute guarantee against unauthorized modification of a VLO 10, a subsequent modification to either Graphic 12 or Postscript 16, or the substitution of another Graphic 12 or Postscript 16 for the original Graphic 12 or Postscript 16, has a high probability of resulting in a discrepancy when Graphic 12 and Postscript 16 are compared against Checksum Field 14F. It will be noted that in alternate embodiments, Checksum Field 14F may be based on the byte sequence in Appendix 14 as well as the byte sequences of Graphic 12 and Postscript 16, and it will be well understood by those of ordinary skill in the relevant arts that yet other similar methods of assuring the integrity of a VLO 10 may be employed.

It will be appreciated that yet other extensions, appendices or additions may be made to the parts of a electronic business VLO 10 in the manner just described, with corresponding extensions in the capabilities, features and purposes of VLOs 10.

Having described the structure and contents of VLOs 10, the following will next describe certain of the uses of VLOs 10 in electronic commerce and will then describe a system and the system components for constructing and using VLOs 10 in electronic commerce.

3. Exemplary Uses of VLOs 10 in Electronic Commerce

A. The Use of VLOs 10 In Purchasing Goods Over The Internet

In a business offering goods or services for sale over the Internet, the seller will publish a Web page containing VLOs 10 wherein each electronic business VLO 10 represents an item or service for sale. In other circumstances, the seller may offer an electronic catalogue in the form of a computer optical compact disk (CD) or magnetic disk, or in a downloadable file or library of such items containing a display of the VLOs 10.

Each electronic business VLO 10 will typically contain a picture of the item or representation of the service as the electronic business VLO 10's Image 12A and the parts of the electronic business VLO 10 will contain all of the information necessary to identify and purchase the item or items represented by electronic business VLO 10. For example, the Image 12A may be an actual picture or artist's rendering of the item offered in the electronic business VLO 10, or may actually be scanned or captured from a seller's existing hard copy catalogues.

The ASCII text fields of the electronic business VLO 10's EDB 14A will, for example, contain the name and address of supplier and such information as the price, shipping and handling charges, options such as available sizes and colors, and other appropriate information, such as taxes and delivery methods and times. The EDB 14A fields or other components of the Appendices 14 of the VLOs 10, such as EMLB 14B and BLOB 14C, may also contain optional or required choices that may or must be specified, such as length, width, height, color, material, text for engraving, method of and priority rating for shipment, date-needed, and other information for ordering the item. Besides being used to present such choices and information to the prospective buyer and to process the buyer's responses and choices, the components of a VLO 10's Appendix 14 may contain, for example, forms to be filled in by the buyer and transmitted to the seller and containing such information as the buyers choices from the selections presented by other information presented from the VLO 10, shipping information and financial information, such as methods and authorizations for payment. Appendix 14 may further include alternative options for buyer selections, or even alternative purchase orders, that are coupled to the initial or preferential options or purchase order so that a buyer may, in effect, say "if you cannot provide a red widget, then I'll take a blue widget" or "if you cannot satisfy this order, then process this second order".

In this regard, it should be understood that, as illustrated from the above descriptions of electronic business VLOs 10, the information provided to a buyer by a seller in an electronic business VLO 10 may be presented directly or indirectly. That is, certain information, such as that describing the goods or services offered, may be contained within the VLO 10 and presented directly therefrom to the prospective buyer. Other information, such as order forms, prices, choices among goods or services, and so on, may be represented in the VLOs 10 by addresses or pointers, such as WWW URLs, to the network locations where the actual information resides. In these instances, the information would be presented to the buyer indirectly, that is, by accessing the indicated network address by means of the buyer's browser or other network access facility and downloading the corresponding information. The choice of whether to provide given information directly from within a VLO 10 or indirectly from a network location identified by information contained in the VLO 10 would depend upon a number of factors, such as the volume of the corresponding information, the control the buyer wishes to exert over the information to be presented, and the frequency with which the information is changed or otherwise modified by the seller. In either instance, however, the information is encapsulated within a VLO 10, either directly by being contained within the VLO 10 or indirectly by means of information providing direct access to the information through the VLO 10.

As described, a electronic business VLO 10 is an encapsulated, self-contained object, thereby providing a prospective buyer with a number of possible actions. For example, the buyer may select one or more VLOs 10 from the display, or copies of the VLO's 10, and drag and drop the selected VLOs 10 into a "shopping cart" repository for later consideration or purchase, store the VLOs 10 in a directory for later action, or e-mail copies of one or more of the selected VLOs 10 to another party, for example, as gift suggestions for birthdays, Christmas, wedding and shower gifts, and so on. It will also be recognized that a electronic business VLO 10 or a copy of a electronic business VLO 10 contains, in itself, all the information necessary to purchase the item, even if it is e-mailed to another party. As such, the recipient of such a "gift list" can, in turn, purchase an item from the list with the same ease, and use the same procedure, as the creator of the list would have followed to purchase the item, provided that the recipient has the necessary purchasing mechanism, credit card facility, and so on, as described in the following.

It will be understood in this regard that placing a copy of a electronic business VLO 10 into a "shopping cart" or file or e-mailing the copy to another party need not execute a purchase transaction. It may merely make a copy of the electronic business VLO 10 available for consideration and possible subsequent purchase, depending on options settings.

When the decision to buy is made, that decision and the VLOs 10 of the items chosen for purchase are indicated to the electronic commerce system running on the purchaser's system, which may be, for example, the system of the party originally selecting the VLOs 10 or the system of a party to which copies of the VLOs 10 have been transported. The purchaser's system will interrogate a purchaser's repository of pertinent information, which may be referred to as a "wallet" which may contain, for example, the buyer's name, address, credit card with bank ID and expiration date, and so on. The purchaser's system will automatically combine required information from the "wallet" with information extracted from the electronic business VLO 10 to construct a purchase order, which is automatically sent to the seller through the Internet as a secure transaction. It should be noted that if the purchase order asks for information not contained in the wallet, the program prompts the user to supply the item interactively.

The sending of the purchase order may initiate seller processes resulting in a response such as order placed, credit card not valid, credit limit exceeded, item temporarily out of stock, or item discontinued. Some of these responses terminate the interaction, others lead to a variety of options, such as submitting a different credit card. It will be understood by those of ordinary skill in the relevant art that such electronic commerce transaction protocols have become common and standardized and, as such, are not the subject of the present invention or the system implementing the present invention. E-transaction protocol is becoming standardized and its details are not the subject of the current disclosure.

It will be apparent, therefore, that the use of VLOs 10 in an electronic commerce system according to the present invention is the functional equivalent to the process executed in a store wherein a product's bar code and a credit or debit card code are electronically read by actions at a local site and a remote site and concluded automatically without detailed intervention or actions by the buyer and the seller. The entire process is easy for the buyer to understand and initiate, and the processing is fast, efficient, economical, and secure.

It will also be noted that the use of a "shopping cart" repository to retain the VLOs 10 representing the goods that have been chosen for actual purchase allows the buyer to group together items for purchase from the same supplier, and that the buyer's system is provided, from the VLOs 10, with all of the information, such as shipping and handling charges and taxes, to compute the total cost of each transaction. This ability thereby allows the buyer to make purchasing decisions based on the total cost of the transaction and to make adjustments and decisions as necessary.

It will be further noted that, because of the ease and speed with which transactions are executed, the buyer's financial information, such as credit card numbers and name and address may be retained locally and submitted separately for each transaction. As such, the buyer's financial information needs to appear in the seller's system only during the actual execution of the transaction and thereafter needs to be stored in the seller's systems only in the highly secured transactions archives, which are generally not accessible to external systems or vulnerable to unwanted access. In addition, the information in EDB 14A is encoded, and is thus accessible only to specified users and applications or systems, that is, to those users, applications or systems having the appropriate means for decoding EDB 14A, such as a decoder, as will be described in the following, and a password or other decoding key. Also, electronic business VLOs 10 are not provided with a programmable interface in the presently preferred embodiment of VLOs 10 and, as such, are not revisable after creation. The contents of an electronic business VLO 10 therefore cannot be read or displayed except with specific permission and authorization, even given a system or application capable of reading the data therein, and cannot be altered or modified after creation, thereby preventing fraud or the gaining of unauthorized access to buyer information through the use of counterfeited or improperly altered VLOs 10.

The use of VLO's 10 also greatly enhances the seller's ability to create and update a catalogue, display or listing of items offered for sale, whether on a Web page or in some form of electronic catalogue, such as a downloadable file or a computer optical compact disk (CD) or magnetic disk. That is, the Web page or catalogue is essentially a display of an array of VLOs 10, each of which represents an item offered for sale or a group of closely related items, differing, for example, in color, size and so on, and each of which is a completely encapsulated and self-contained object containing all information necessary to purchase the item or items. As such the creation of a Web page or catalogue is primarily the creation of the individual VLOs 10, which may often be in the form of one or a few standardized VLOs 10 differing primarily in the detailed information residing in the electronic business VLO 10 fields.

The updating of offerings on the Web page or in the catalogue is likewise simplified as requiring only the updating of the affected VLOs 10, or the adding or removal of VLOs 10, and not the entire Web page or catalogue as an entity. It is likewise easy for the seller to add short-life VLOs 10 to the Web page or catalogue, such as VLOs 10 offering time limited special prices or discounts and specialized VLOs 10, such as "coupon" VLOs 10. Furthermore, the updating of a VLO 10, wherever it resides, is an atomic action. As such, and even though the directory or file is not "locked" for an update, it is impossible for an end user, that is, buyer, to use, for example, a new model number and an old price, or vice versa.

As a further advantage, and because VLOs 10 are encapsulated and self contained, a seller may "push" VLOs 10 down to a visitor to a Web page, either directly when the user visits the Web page or through electronic mail to previous visitors/buyers, thereby allowing proactive marketing and advertisement of goods. The encapsulation of VLOs 10 as self-contained entities further allows the seller to easily create specialized or seasonal catalogues, and the ability of a electronic business VLO 10 to contain such diverse information as video clips, sound clips and additional pictures and graphics further allows the seller to provide, for example, sample cuts from music CDs or videos offered for sale.

B. Purchase Transactions Requiring Configuration of Goods

It has been described previously that the sale and purchase of complex goods requiring that informed choices be made regarding the goods, often involving the selection of component parts, many of which either must or cannot be used in certain combinations but may or must be used in other combinations, such as airline travel tickets, health insurance, automobiles and computer systems, is very difficult to perform remotely, such as through the Internet. As discussed, Web pages that attempt to provide such goods are typically very extensive, complex and confusing and often result in frustration of the potential buyer and inoperable configurations of the goods.

As described, an electronic business VLO 10 is a self-contained, encapsulated entity that contains all of the information necessary to purchase a given item. That information may include, for example, in EDB 14A, links to other VLOs 10 representing component parts of an item or system, such as computer system, represented by a "system" electronic business VLO 10. The "system" electronic business VLO 10 and the related component VLOs 10 may, in turn, contain relevant text, questions, programs, advice, pointers and links, including configuration and compatibility requirements and suggestions and a flow process, to guide a prospective buyer through the process of configuring the item to be purchased. As has been described, the information provided to a buyer by a seller in an electronic business VLO 10 may be presented directly or indirectly. That is, certain information, such as that describing the goods or services offered, may be contained within the VLO 10 and presented directly therefrom to the prospective buyer. Other information, such as order forms, prices, choices among goods or services, and so on, may be represented in the VLOs 10 by addresses or pointers, such as WWW URLs, to the network locations where the actual information resides. In these instances, the information would be presented to the buyer indirectly, that is, by accessing the indicated network address by means of the buyer's browser or other network access facility and downloading the corresponding information. The choice of whether to provide given information directly from within a VLO 10 or indirectly from a network location identified by information contained in the VLO 10 would depend upon a number of factors, such as the volume of the corresponding information, the control the buyer wishes to exert over the information to be presented, and the frequency with which the information is changed or otherwise modified by the seller. In either instance, however, the information is encapsulated within a VLO 10, either directly by being contained within the VLO 10 or indirectly by means of information providing direct access to the information through the VLO 10.

In a purchase requiring configuration of the goods or services, such as a computer system, a prospective buyer of a computer system may be presented with a Web page containing several VLOs 10, each representing a basic computer system for which the component parts must be configured and selected according to the buyer's needs as regards functionality and price. The buyer could then review the basic characteristics of the base systems by viewing the contents of the base system VLOs 10 and, having selected a candidate base system, indicate that electronic business VLO 10. Routines stored, for example, in the BLOB 14C of that electronic business VLO 10 could then call up an array of further VLOs 10 representing the possible component parts that might be added to that base system, such as memory, disk drives, peripherals, software and so on. Then, upon tentatively selecting one or more component parts, the buyer's system, reading information from the VLOs 10, may advise the buyer as to the compatibility or requirements of each of the selected component parts, guiding the buyer to compatible components when the buyer has selected an unusable combination of components and suggesting choices for the components not yet selected. The process, by using the information placed in the VLOs 10 by a person knowledgeable in the subject matter, would thereby be guided easily and visually through the process of selecting a configuration that meets the buyer's requirements. The process could include calculation of the running subtotal price at each step and for each possible configuration under consideration, so that the buyer would arrive at a configuration meeting all of the buyer's requirements.

It will be described in following discussions that an exemplary system utilizing VLOs 10 for electronic commerce includes a "decoder" for reading VLOs 10 and interoperating with VLOs 10. As will be described, this "decoder" may be installed in the buyer's system in a number of ways, including downloading from a seller's Internet site at the time of an initial consideration of the seller's goods. In such instances as goods requiring configuration choices, the basic "decoder" may be expanded by the seller of the configurable goods to facilitate the configuration process described above, as well as the basic functions of reading VLOs 10.

Having described VLOs 10 in detail, and having described certain of the possible functions and advantages of VLOs 10 in electronic commerce, the following will next describe an implementation of an electronic commerce system using VLOs 10 and the component parts of a system implementing electronic commerce using VLOs 10.

4. An Electronic Commerce System Utilizing VLOs 10 (FIGS. 3 and 4)

A. General Description of a Networked System Utilizing VLOs 10 (FIG. 3)

Figure 3:
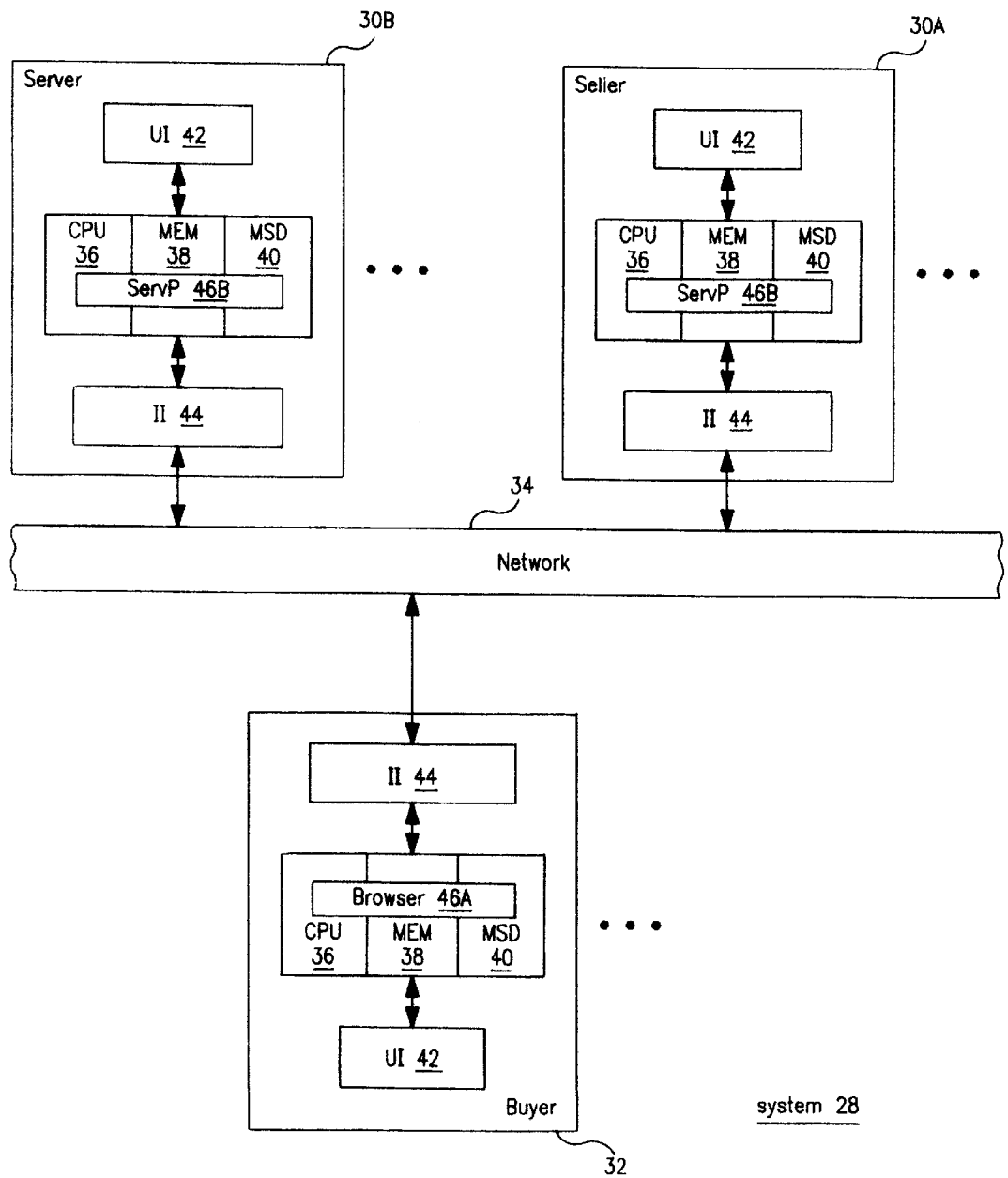
FIG. 3 is a block diagram of a system utilizing visual link objects.
Figure 4:
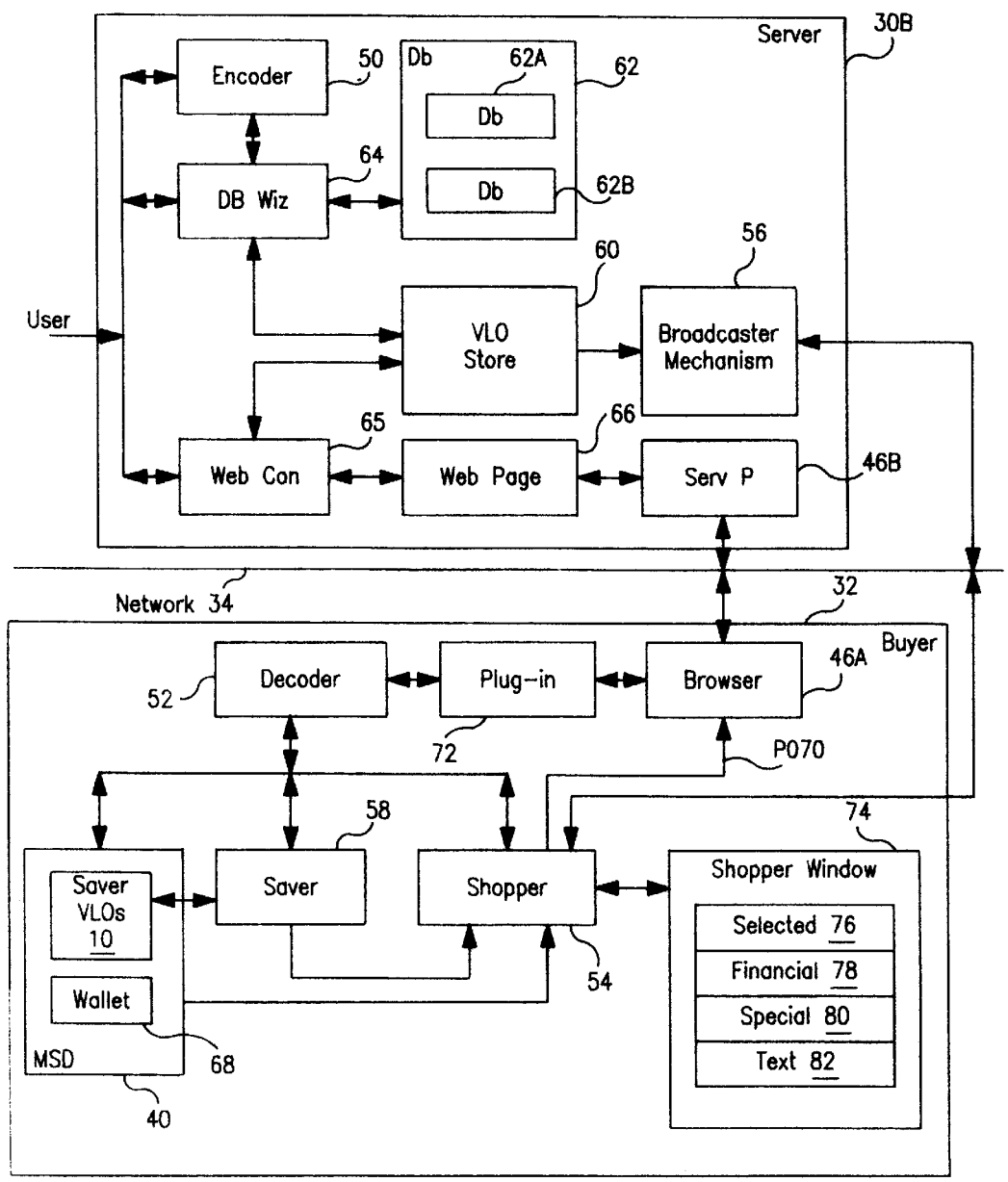

Referring to FIG. 3, therein is presented a general block diagram of a networked System 28 utilizing electronic business VLOs 10 for electronic commerce. As represented therein, System 28 will typically include one or more Seller Systems (Sellers) 30A belonging to the individuals, companies or corporations offering goods or services, one or more Seller Servers (Servers) 30B through which the goods or services are offered, and one or more Buyer Systems (Buyers) 32, all interconnected through a Communications Network (Network) 34, such as the Internet.

Sellers 30A, Servers 30B and Buyers 32 are typically each based upon a computer system comprised of a Central Processing Unit (CPU) 36, a Memory 38, a Mass Storage Device (MSD) 40, such as a disk drive, a User Interface (UI) 42, which are typically comprised of a display screen, keyboard and mouse, and an Internet Interface (II) 44, such as a modem. Each Buyer 32 will typically include an Internet/WWW interface and access program, represented as Browser 46AA, which, for example, may be comprised of Netscape Navigator or Microsoft Internet Explorer, while corresponding Server Programs (ServP) 46B are provided in Servers 30B and Sellers 30A to enable Servers 30B and Sellers 30A to communicate over the Internet and, in particular, to allow Servers 30B to operate as Internet servers. These components of System 28, Seller 30A, Server 30B and Buyer 32 are, however, conventional and well understood by those of skill in the relevant arts and, as such, will not be discussed further herein.

B. General Description of an Electronic Commerce System 48 (FIG. 4)

Referring now to FIG. 4, therein is shown a block diagram of the components of an Electronic Commerce System (ECS) 48 using VLOs 10 for electronic commerce and implemented, for illustrative purposes, in a System 28 as described above. As illustrated therein, the basic components of an ECS 48 most typically include a VLO Encoder (Encoder) 50, which may be resident in a Server 30B or other system available directly or indirectly to the seller and which is used to construct VLOs 10, and a VLO Decoder (Decoder) 52 which is resident in Buyer 32 and is used to read and interpret VLOs 10.

Other components of ECS 48 may include a VLO Shopper (Shopper) 54 which is resident in Buyer 32 and is used by the buyer to organize and facilitate business transactions with VLOs 10, a VLO Broadcaster Mechanism 56, which, as will be described, has components resident in a Server 30B and in a Buyer 32 and is used to "broadcast" or "push" VLOs 10 down to Buyer 32 or to prepare a database to be polled, that is, pulled, by a program resident on the Buyer 32 system, and a VLO Screen Saver (Saver) 58, which may be resident in Buyer 32 and is used to display electronic business VLOs 10.

As will be described below, the components of ECS 48 operate cooperatively with certain other programs, such as Browser 46AA, to perform certain of the functions of ECS 48. Such programs, or their equivalents, are commonly available and are well known in the relevant arts, as will be discussed in the following.

C. Encoder 50 (FIG. 4)

First considering the construction of electronic business VLOs 10, VLOs 10 may be constructed either by means of VLO Encoder (Encoder) 50 or by means of any utility or program or combination thereof that is capable of performing the necessary operations on the components of a VLO 10. In the instance of manual construction of electronic business VLOs 10, the creator of the VLOs 10, operating on Server 30B or any other system having the necessary capabilities, such as Seller 30A, will manually construct one or more VLOs 10 having the structure described previously, generally by manually writing the necessary information into the fields of a electronic business VLO 10 template. The creator will then add the electronic business VLOs 10 to a Web page using or add the VLOs 10 to a VLO Store 60 for transporting to a potential buyer by other means, as will be described below. While this method is generally adequate for small numbers of VLOs 10, most users will elect to construct larger numbers of electronic business VLOs 10 by use of Encoder 50, whose primary function is the construction of VLOs 10.

Encoder 50 is illustrated in FIG. 4 as operating in Server 30B, but it will be understood by those of skill in the relevant arts that Encoder 50 and the associated cooperative programs may be employed in any other system having the necessary capabilities, such as a Seller 30A, and that the results of Encoder 50 operations, that is, VLOs 10, may then be transferred into Server 30B for use.

As represented in FIG. 4, the information and graphics that are to be used in constructing VLOs 10 will typically be stored in a Database (Db) 62, which may be a Jasmine database or a similar object oriented database, represented as Database (Db) 62A, or any other convenient form of Database, represented as Database (Db) 62B. Encoder 50 operates in conjunction with a Database Wizard (DBWiz) 64, which in turn operates under user direction to select and read from Db 62 the information that is to appear in each electronic business VLO 10's fields, including the graphic file of Image 12A. Encoder 50 constructs each electronic business VLO 10 from the information obtained through DBWiz 64 and stores the completed VLOs 10 in a VLO Store 60 for subsequent incorporation into a Web page or for transport to prospective buyers by other means. When, for example and as illustrated in FIG. 4, VLO Store 60 is a Jasmine database or similar form of database adapted for operation with a Web page construction program, Encoder 50 may write the completed VLOs 10 back into the DB 62A, either as replacements for original graphics representing the items encapsulated in the VLOs 10 or as new properties or database entries relating to the items.

Finally, a Web Page Construction Program (WebCon) 65, such as Jasmine Studio, may be used to read the VLOs 10 from DB 62 and to embed the VLOs 10 into one or more Web Pages 66 for subsequent downloading to a Buyer 32 when a user of Buyer 32 views Web Page 66 through Network 34.

As has been described previously, the VLOs 10 may be transferred to a Buyer 32 through other means, such as on a computer optical compact disk (CD) or magnetic disk or in a downloadable file or by direct "push" through Network 34 through operation of a Broadcaster Mechanism 56. As represented in FIG. 4, VLOs 10 transferred to a Buyer 32 by means of a computer magnetic disk or by means of a downloadable file will be stored in the Buyer 32's MSD 40 while VLOs 10 residing on a computer optical compact disk will be available to the Buyer 32 through a computer CD disk peripheral effectively operating as part of MSD 40. Broadcaster Mechanism 56, which will be discussed further below, is effectively a means for "push" downloading of VLOs 10 to a Buyer 32 in a manner analogous to the downloading of VLOs 10 of a Web Page 66, but separately from the Web Page 66 and on an individual electronic business VLO 10 basis.

Lastly with regard to the structure and operations of a Server 30B, and in consideration of the operation of a Buyer 32, it will be noted that the ECS 48 programs of modules typically residing in and operating in a Buyer 32, such as Decoder 52, Shopper 54, and Saver 58, may be provided to a Buyer 32 in a variety of ways, such as loading from a computer CD or magnetic disk. These components of ECS 48 that function in a Buyer 32 may also be downloaded from a Server 30B or other network server, for example, at any time a Buyer 32 goes to, or visits, a Server 30B or other network server on which these programs reside, as indicated in FIG. 4 wherein these ECS 48 components are shown as stored in the Server 30B MSD 40. The downloading may be at the initiative of the user of Buyer 32, that is, the user may seek a network server having the components of ECS 48 and request that at least selected components of ESC 48 be downloaded by file transfer as is the common practice with other programs. Alternately, the downloading may be, at least in part, automatic when a user of a Buyer 32 visits a Server 30B in which the ECS 48 components reside. For example, the Server 30B may query the Buyer 32 as to whether it contains at least a Decoder 52 and may automatically download a copy of Decoder 52, upon permission of the user of Buyer 32, if a copy of Decoder 52 is not already resident on the Buyer 32. In such instances, the downloading of the remaining buyer 32 resident components of ECS 48, such as Shopper 54 and Saver 58 may be automatic with the downloading of the copy of Decoder 52, or at the permission of the user of the Buyer 32.

D. Decoder 52 (FIG. 4)

Next considering the operation of ECS 48 in a Buyer 32, as previously described a electronic business VLO 10 is encoded and has a unique internal structure and, as such, a Decoder 52 or equivalent facility is required to decode VLOs 10 and to read the data from VLOs 10.

Browser 46A, which may be, for example, Netscape Navigator or Microsoft Explorer, operates in the manner well known to those of skill in the relevant arts to communicate with a Server 30B through Network 34 and to download Web Pages 66 and display Web Pages 66 to a user of Buyer 32. In this regard, Browser 46A can display the Images 12A of VLOs 10, but in itself cannot decode or read the other contents of VLOs 10, and Decoder 52 interfaces automatically with Browser 46A, and Shopper 54, to decode VLOs 10 when the information residing in Appendix 14 is required for an operationBrowser 46A. In a present implementation, Browser 46A will generally display VLOs 10 in a screen display or as part of a web page simply as images comprised of the Image 12A components of the VLOs 10 and Decoder 52 is called to decode the Appendix 14 of a VLO 10 only when the information residing in the Appendix 14 is required for an operation, such as the purchase of goods represented by a VLO 10.

If the user of Buyer 32 elects to purchase one or more items represented by VLOs 10, Decoder 52 will, upon user command inputs selecting the corresponding VLOs 10 and indicating the user's purchase decision, read the necessary user financial information from a Wallet 68, which is a repository that resides in the Buyer 32 MSD 40 and that may contain, for example, the buyer's name, address, credit card with bank ID and expiration date, and so on. Decoder 52 will automatically combine the required information from Wallet 68 with any necessary information extracted from the selected electronic business VLO 10 in a template form contained in the selected electronic business VLO 10 to construct a Purchase Order (PO) 70, which Decoder 52 will then transmit to Server 30B through Network 34 in a secure transaction.

It should be noted that, in the present preferred embodiment of ECS 48 each user's financial information is stored in a corresponding individual electronic business VLO 10 in Wallet 68, thereby being at least encapsulated and encoded and readable only be Decoder 52. In addition, the VLOs 10 in Wallet 68 and containing user financial information may also be encrypted and password protected, thereby providing additional security and obviating the requirement for "cookies".

In the present embodiment, Decoder 52 is designed to be operable with virtually any Browser 46A that is presently available or will be available in the future, although "plug-ins", represented in FIG. 4 as Plug-in 72, may be necessary to interface Decoder 52 with certain Browsers 46. For example, in the present embodiment, Decoder 52 is implemented as an ActiveX control and the Ncompass ScriptActive plug-in is presently required for Decoder 52 to support Netscape Navigator. It will be recognized by those of ordinary skill in the relevant arts, however, that Decoder 52 may be implemented in many specific forms and that the specific implementation of a Decoder 52 and whether or not plug-ins are required and the form of any necessary plug-ins will depend upon such factors as the system in which the implementation of Decoder 52 is operating, the specific Browser 46A the Decoder 52 is operating with and the choices of the designer. It will also be recognized that, because VLOs 10 can be displayed by essentially any Browser 46A on any computer platform, applications can be created that support both Microsoft Windows and non-Windows platforms, using the additional functionality of VLOs 10 on Windows platforms and offering standard HTML type links on other platforms.

E. Shopper 54 (FIG. 4)

Referring again to FIG. 4, ECS 48 may include a Shopper 54 which is resident in Buyer 32 and is essentially a facility that may be used by the buyer to organize and facilitate business transactions with VLOs 10. As illustrated in FIG. 4, Shopper 54 constructs and displays a Shopper Window 74 having, for example, a Selected VLO sub-window (Selected) 76, a Financial Display sub-window (Financial) 78, a Special Display sub-window (Special) 80 and a Text/Help Bar sub-window (Text) 82. Shopper 54 uses methods similar to the commonly available and well known "drag and drop" functions that are available in, for example, Microsoft Windows, to allow a user to drag or copy VLOs 10 selected by the user from a Web Page 66 to, for example, Selected 76 sub-window where the selected VLOs 10 are retained and displayed for subsequent consideration and actions by the user. It should be noted, in this regard, that there may be more than one instance of any of the Selected 76, Financial 78, Special 80 and Text 82 sub-windows, that each instance of a sub-window may contain an independent set of data, and that the sub-windows may be free-floating, that is, independent of and separate from the "main" Shopper Window 74.

The user may, for example, elect to view the information, such as price, color selections, and so on, regarding the item corresponding to a given selected electronic business VLO 10, in which instance Decoder 52 operates in conjunction with Shopper 54 to decode and read the information from the electronic business VLO 10 and to display the information in, for example, pop-up sub-windows in Selected 76.

The user may visually and functionally organize and group VLOs 10 in Selected 76, for example, by moving certain of the VLOs 10 into visual groupings, or by shift-clicking on successive VLOs 10 with corresponding highlighting of the indicated VLOs 10, or by "stretch boxing"

around selected VLOs 10 and VLOs 10 may also be acted upon one at a time by "clicking" or "dragging". Pop-up sub-menus activated, for example, by "right clicking" or by additional "control buttons" located in Selected 76 or Financial 78, may then, for example, allow the user to direct Shopper 54 to invoke an e-mail program and to e-mail the indicated VLOs 10 in an attachment to an e-mail message or may allow the user to direct Shopper 54 to calculate the total price, including shipping and taxes, of the items represented by the selected VLOs 10. The user may also elect to discard certain of the VLOs 10 displayed in Selected 76, or to direct Shopper 54 to package certain selected ones of the VLOs 10 into a directory to be stored for later consideration.

Financial 78 contains, as indicated, a display of financial matters relating to the user, such as the credit/debit cards available to the user for purchases, the total amounts charged to selected accounts, and credit/debit card information such as account/card numbers, expiration dates and so on. In certain implementations, and given that the user and Buyer 32 have access through Network 34 to the pertinent financial information, for example, from banks or other credit/debit card companies, Financial 78 may also display such information as the balance, limit, charges to date and payments to date on each of the user's credit or debit card accounts or checking and savings accounts.

A user may use Selected 76 and Financial 78 together to purchase items corresponding to the VLOs 10 displayed in Selected 76. For example, the user may drag and drop individual or grouped VLOs 10 from Selected 76 to a representation of a credit or debit card in Financial 78, using any of the methods just described, or by indicating the VLOs 10 to be purchased and "clicking" on a credit/debit card representation in Financial 78, and so on. In a present implementation, for example, purchases are executed by dragging a electronic business VLO 10 onto a representation of a credit or debit card or by dragging a representation of a credit or debit card onto a electronic business VLO 10. Also, these functions may be implemented on a per electronic business VLO 10 basis. That is, clicking on a electronic business VLO 10 will display relevant information and status regarding the electronic business VLO 10 and, when a electronic business VLO 10 is dropped onto a representation of a credit or debit card, Shopper 54 will display the purchase information relevant to the electronic business VLO 10 for the buyer to verify and will then execute the purchase when confirmed by the buyer.

The area of Shopper Window 74 indicated as Special 80 may, in turn, be used for special purpose display functions. An example of such could include the display of gift, wedding, shower or other wish lists of VLOs 10 as the electronic business VLO 10 contents of the list are selected from a Web Page 66 or Selected 76 by the user, with the list subsequently being e-mailed to other parties or posted on a Web page on Buyer 32 for perusal by other users of System 48. In a further example particular to ECS 48, and as will be described below with regard to Broadcaster Mechanism 56, Special 80 may be used for the display of VLOs 10 "push" downloaded from a Server 30B. In yet other implementations, Special 80 may appear as an "advertisement space" wherein advertisements are displayed to the user and wherein the advertisements may include, for example, VLOs 10 or advertisements in other formats, such as the banners presently commonly seen in areas of web pages.

Finally, the Text/Help Bar 82 of Shopper Window 74 is used by Shopper 54 to display text messages to the user, such as total cost of items selected, credit card amount charged during the current session, the e-mailing status of packaged VLOs 10, help in using Shopper 54, and so on.

F. Broadcaster Mechanism 56 (FIG. 4) As shown in FIG. 4, Broadcaster Mechanism 56 has components residing in Server 30B that interact with a Seller 30A and a Buyer 32 to load VLOs 10 from a Seller 30A to a Broadcaster Mechanism 56 database in Server 30B and to then broadcast, or download, individual VLOs 10 or groups of individual VLOs 10 to a Buyer 32 from the Broadcaster Mechanism 56 database of VLOs 10. The VLOs 10 broadcast through Broadcaster Mechanism 56, which are hereafter referred to as "broadcast" VLOs 10, are downloaded to a Buyer 32 on the basis of "subscriptions" by a given Buyer 32 to selected "channels" rather than as part of or in association with a Web Page 66 accessed by a Buyer 32, as described above. In this regard, a "channel" is a time varying set or group of VLOs 10 having a commonalty of subject matter as represented by the contents of the VLOs 10 of the channel, or a set or group of targeted recipients. One or more Buyers 32 may be "subscribers" to a given channel or channels wherein a "subscription", in turn, is an agreement between a Seller 30*a* and a subscriber, or an authorization of a subscriber, for the subscriber to receive the VLOs 10 broadcast through a given channel or channels.

"Broadcast" VLOs 10 use basically the same structure and organization as electronic business VLOs 10 and may be used for similar purposes, but are also utilized for a range of other purposes related to the delivery of user selected subject matter. As will be described, broadcast VLOs 10 and the "channels" and "subscriptions" through which they are delivered to the users of Buyer 32 systems may be tailored, in their subject matter and content, for an extensive range of specific purposes.

In electronic business applications, for example, broadcast VLOs 10 may be used to deliver information relating to special subjects or topics of a commercial nature, such as special, time limited offers of items, perhaps at special prices or discounts or for promotional purposes, special announcements, offers to selected Buyers 32, and so on. This form of broadcast VLO 10 may, for example, be delivered to the users of Buyer 32 systems in the same manner as radio, television, magazine or newspaper advertising, or may be provided in association with other forms of subscriptions, as will be described.

In other applications, broadcast VLOs 10 may be used to provide news and articles, either in the form of general selections as provided, for example, by newspapers, news magazines and radio and television broadcasts, or in the form of selections tailored to the needs or desires of individual users of Buyer 32 systems, as provided, for example, by magazine subscriptions or news clipping services. In yet other applications, channels and the VLOs 10 may provide selections of computer games, computer programs, stories, articles and on-line research facilities and libraries.

Channels and the broadcast VLOs 10 provided therethrough may be narrowly or broadly focused, depending upon the interest group addressed by each channel and its VLOs 10. For example, some channels may be focused for children, and may carry VLOs 10 providing selections of games, programs, stories, articles and on-line research facilities and libraries tailored for children. Other channels may be narrowly focused and provide broadcast VLOs 10 directed to subject such as stock or financial reports, articles on specific medical topics, articles published in specific academic fields, and so on, while others may be broadly focused, in the manner of a newspaper or television news show. It will therefore be apparent that the contents and subject matter of a given channel and the broadcast VLOs 10 provided therethrough may, in effect, be selected and chosen by the subscribers to the channels as well as by the channel providers, in the same manner as magazines, newspapers and so on.

Also, it will be apparent that there are a number of possible forms of "subscription", depending upon the contents of each channel and the market value of the channel contents to the subscribers. For example, at least some channels will be provided on a "paid" subscription basis, such as children's channels providing downloadable games and articles, channels providing information or articles for specific interest groups or business interests, such as academic publications and stock or financial reports, news channels, and channels providing the electronic equivalent of magazine subscriptions. There may also be significant variation among "paid" subscriptions, ranging from a blanket payment for all contents of a given channel through payment on a per item downloaded basis. Yet other channels will be provided on the basis of "free" or "seller controlled" subscriptions that may be provided to all users of a Buyer 32 system equipped to receive broadcast VLOs 10, or in association with another service or subscription provided by a Seller 30A, such as a "paid" subscription. It will be appreciated that the payments for a given channel will depend upon such factors as the perceived market value of the information or subject matter provided through the channel, the size of the user base, that is, number of subscribers, of the channel, the degree of control and selectivity that the subscribers exercise over the contents of the channel, and the contents of the channel. For example, a channel primarily or exclusively carrying advertisements for goods or services, even if targeted for a specific interest group, will most probably be a "free" subscription channel, or available for at least a relatively lost cost subscription. The cost of yet other channels may be affected by whether the channel carries "advertisements" as well as the desired subject matter, or whether certain channels are offered as "group" under a single subscription, and whether the subscriber has the option of not receiving "advertising" content or an advertising channel. In yet other instances a subscription may be dependent upon the authorized use of a component or add-on to Shopper 54 or a specific version of a Shopper 54, such as a Shopper 54 specifically designed and adapted for use by children.

Finally in this regard, it has been described above that broadcast VLOs 10 use basically the same structure and organization as electronic business VLOs 10. The particular contents of a broadcast VLO 10, however, adapt and utilize the structure and organization of a VLO 10 for the purposes of broadcast VLOs 10. For example, it has been described above that function of a broadcast VLO 10 is to provide subject matter subscribed for, such as offers for goods or services, news, articles, stories, information of various forms and at least certain types of goods that may be delivered through a computer network, to a subscriber. It will be apparent that the structure of a VLO 10 as described herein above is capable of containing a virtually unlimited amount of information in essentially any form that may be transmitted through a computer network and handled by a computer system. For example, a computer game or program, the text of a magazine or story, set of selected news articles, a piece of music, or a financial report all may be encapsulated in a Blob 18 and transmitted to a subscriber in a VLO 10, and that a broadcast VLO 10 may be an electronic business VLO 10 containing an offer for goods or services as described above. It will be apparent, however, that there will be instances or applications wherein it will be impractical or undesirable to encapsulate the subscribed subject matter in the broadcast VLO 10 initially presented to a subscriber. For example, some computer games or programs or the text of books or collections of articles in, for example, the electronic equivalent of a magazine, may be relatively large, such as on the order of several megabytes. In such instances, the transmission time required to download, for example, a computer game or program, complex or extensive data or information in graphic form, or extensive text, may be excessive unless the subscriber specifically desires to receive the subject matter contained in a broadcast VLO 10. The initially broadcast VLO 10 may therefore contain, rather than the full subject matter, a link, such as a URL, to another VLO 10 or downloadable file in any desired form, containing the full subject matter of the initial VLO 10. The initially broadcast VLO 10 may also contain a capsule description or summary form of the subject matter, such as a demonstration version of the game or program or extracts or summaries of the subject matter of the VLO 10. The subscriber may then view the initial broadcast VLO 10, for example, reading the description, extract or summary or running the demonstration version of the game or application program, viewing a "thumbnailed" graphic or listening to a music clip, and may then activate the link to download the full subject matter if desired. In yet other implementations, the contents of a broadcast VLO 10 may be compressed using any of a number of commonly known and used data compression methods, such as "zip" compression, to reduce the downloaded volume of data in a broadcast VLO 10. This method thereby allows the full contents of the VLO 10 to be downloaded to a subscriber in a single step, but requires the subscriber to "decompress" the VLO 10 to view the contents of the VLO 10.

As indicated in FIG. 4, and as will be described in further detail in a later description, a user having a subscription to one or more channels may receive the broadcast VLOs 10 provided from Server 30B through the subscribed channels. As shown in FIG. 4, Broadcaster Mechanism 56 communicates directly with Shopper 54, through IIs 44 and Network 34, rather than through Browser 46A, whereby Shopper 54, after receiving the broadcast VLOs 10, displays the broadcast VLOs 10 in, for example, the Special 80 area of Shopper Window 74. Thereafter, the displayed broadcast VLOs 10 may be decoded and examined by a user through operation of Decoder 52, in the manner of other VLOs 10. The user may open and examine and save the contents of the broadcast VLOs 10, and may use the information contained therein to download the full subject matter of the VLOs 10 if necessary and desired, as described above, and may purchase of items in the manner of electronic business VLOs 10 in those instances wherein the broadcast VLOs 10 contain offers for goods or services. In the presently preferred implementation of ECS 48, the Special 80 area of Shopper Window 74 may be used by a single Server 30B system at a time, and only so long as Buyer 32 is in access to the Broadcaster Mechanism 56 of that Server 30B with a valid subscription to a channel supported by the Server 30B. When the access of Server 30B by Buyer 32 terminates, for example, when the Buyer 32 accesses another Server 30B, or possibly a different Web Page 66 in the same Server 30B, use of the Special 80 area by the Broadcaster Mechanism 56 of that Server 30B terminates. Lastly, and as described next below, the broadcast VLOs 10 broadcast or downloaded by Broadcaster Mechanism 56 may also be displayed through Saver 58.

G. Saver 58 (FIG. 4)

Screen Saver (Saver) 58 is a relatively conventional screen saver typical of those common used in the Microsoft Windows type operating environment, except for being designed to display VLOs 10, that is, the Images 12A of VLOs 10. As such, Saver 58 is connected from Decoder 52 so that Decoder 52 may transfer single VLOs 10, such as those received through Broadcaster Mechanism 56, to Saver 58 for display. Unlike the display of VLOs 10 in the Special 80 area of Shopper Window 74, however, the VLOs 10 transported to Saver 58 are retained and stored in Saver 58 or, for example, in MSD 40, for continuing display by Saver 58. In addition, the VLOs 10 displayed by Saver 58 may be accessed by a user through Decoder 52 and Shopper 54, if installed in the Buyer 32, and may be used for the purchase of corresponding items in the same manner as those displayed through VLOs 10 in Shopper Window 74. Alternatively, the VLOs 10 may invoke a Browser 46A and cause the Browser 46A to access a corresponding web page containing "purchasable" VLOs 10.

5. Detailed Description of the Encoder 50, Decoder 52, Shopper 54, Broadcaster Mechanism 56 and Saver 58

Having described the overall structure and operation of an ECS 48 utilizing VLOs 10, the following will next described certain components of an ECS 48 in further detail and, in particular, Encoder 50, Decoder 52, Shopper 54, Broadcaster Mechanism 56 and Saver 58. The remaining components of an ECS 48 according to the present invention will not be described in further detail as either being well understood by those of ordinary skill in the relevant arts without further description or implementable through commercial available components, as described above.

A. Encoder 50 (FIG. 5)

mAs has been described, a VLO 10 is a single, unitary file having a standardized but flexible basic internal structure comprised two or more internal parts of differing nature and content. In a presently preferred embodiment, a minimum, essential VLO 10 file has at least a first part containing a graphic file, that is, Graphic 12 containing Image 12A in a standard image format, such as a JPEG or GIF format, and an Appendix 14 that contains at least an EDB 14A containing encoded text and/or non-text data. It should be noted that the first part of a VLO 10 file, which is generally referred to herein as containing a graphic file, Graphic 12, could contain a non-graphic binary file in certain instances. It should also be noted that Appendix 14 will probably also include additional parts, each containing a particular type or class of data. As described, a VLO 10 file is internally self describing as regards the type or class of data contained in each part of the VLO 10, and the location or locations of each type or class of data in the VLO 10. A VLO 10 file may thereby contain virtually any form of information in virtually any information format, thus allowing VLOs 10 to be adapted and used for a wide variety of purposes and functions.

The operations and functions of Encoder 50 and Decoder 52 are primarily concerned with the Appendix 14 of a VLO 10. As will be described, the Appendix 14 is encoded and merged with the other components of the VLO 10 in such a way that any modification to the VLO 10 file, once encoded, such as an attempt to modify the copyright or the Image 12A or to copy or paste Appendix 14 from one Graphic 12 to another will almost certainly render the Appendix 14 unreadable so that the VLO 10 cannot be decoded by a Decoder 52.

Figure 5:
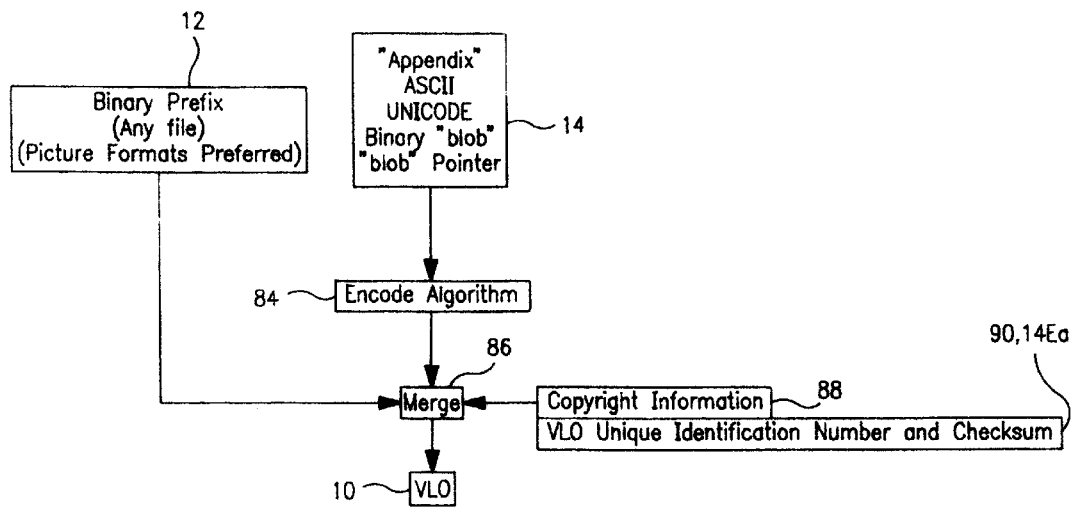
FIG. 5 is flow diagram illustrating the operation of an encoder for the construction of a visual link object.

First considering the operations and functions of Encoder 50 as illustrated in FIG. 5, Encoder 50 includes an Encode Algorithm Processor 84 that receives the individual contents of Appendix 14, such as the individual contents of EDB 14A, EMLB 14B, Blob 14C and Prog 14D and encodes these separate elements into the appropriate components of Appendix 14, as previously described. Encoder 50 further includes a Merge 86 that receives the encoded components of Appendix 14 from Encode Algorithm Processor 84, a Copyright Notice 88, a VLO Unique Identification Number 90 with a Checksum 14E$a$ and the Graphic 12 Image 12A file and merges these elements into the final VLO 10.

It will be apparent that Merge 86 operates only to merge the separate components of a VLO 10, that is, the Graphic 12 file, the Appendix 14 and such other components as the Copyright Notice 88 and VLO Unique Identification Number 90 into a single composite file. The structure and operation of Merge 86 will therefore be apparent to those of ordinary skill in the relevant arts. The functions of Encode Algorithm Processor 84, however, are more complex and will be described in further detail next below.

In the presently preferred embodiment, Encode Algorithm Processor 84 is implemented by program control of a general purpose processor, such as a CPU 36. As such, the functional and structural properties of Encode Algorithm Processor 84 may be described by the functions, processes and methods executed by Encode Algorithm Processor 84 and by its interfaces to VLOs 10, which include:

1) StartVLO: This process starts the building of a VLO 10 by clearing out any leftover information from the construction of a previous VLO 10 and defines which version of a VLO 10 is being constructed. For example, VLOs 10 may be constructed in an ASCII format or in the presently preferred format, which is described in the present discussion.

2) AddValue(Key as String, Value as Variant, optional Type as String): This process adds a new value item, that is, and for example, a GeneralIFs 14A$b$, a SpecificIF 14A$c$, Locator Key 14A$d$, a Type Field 14B$c$, a Sub-Blob 14C$a$, File Key 14D$b2$, and so on, to the VLO 10 currently being operated upon. The three component fields of a value item are, as indicated, a Key field, a Value field and a Type field. The contents of the Key field are a text string and the contents of the Value field may be, for example, a text string or a byte array, so that if the Value field contains a text string, the Type will be "text", and if the Value field contains a byte array the Type will be "binary". If the Type field is left off, or empty, the type of the contents of the Value field will be determined by the type of the Value variant, that is, the contents of the Value field. In each case, the length of any field is the actual current length of the String or byte array contained therein.

It should be noted that a string Value has no arbitrary constraints on the text it may contain and may, for example, be any combination of Unicode characters, and that a blob Value is just a byte array, with no constraints on the actual bytes stored.

A third type of value item may be a "right click", abbreviated as "RC", which pertains to an entry in a "right click" menu and may be included if the inherent autogeneration of "right click" menus are desired. In the presently preferred embodiment of VLOs 10 and systems operating with VLOs 10, however, "right click" menus are implemented by means of functions in, for example, Decoder 52, and the "right click" keys residing in VLOs 10, that is, Key Formats 14C$b1$, remain in the VLOs 10, but primarily contain pointers to BLOB 14 fields. Assuming, however, that an implementation is to provide the inherent autogeneration of "right click" menus, as has been described, the value of this key will be added to the right-click menu of the control when the VLO 10 is displayed. As has also been described with reference to FIG. 1, right click menu value item contains three fields, each delimited by a comma in the present embodiment, and containing a caption in Literal 14Cb2, a filename in FileEx 14Cb3, and a blob key in Ptr 14Cb4. As described, the caption in Literal 14Cb2 is displayed in the right click menu in the literal form that it appears in the caption field in the present embodiment but, in alternate embodiments, may employ, for example, backslashes in the caption string to represent nested right-click menus. The filename in FileEX 14Cb3, as also described, refers to a program that may be executed in performance of the right click menu choice. The filename itself refers to a recommended filename, in the system temp directory, of such a data file but, in the presently preferred embodiment, the most significant component of FileEx 14Cb3 is the filename extension. As described, the file extension is identified to the operating environment programs and the operating environment programs will identify the program residing therein that is capable of operating upon files of the type identified by the file extension and will invoke the corresponding program to operate upon the identified file. The blob key in Ptr 14Cb4, in turn, is the key for a separate blob value, which is an image of a file. When the user chooses this item from the right-click menu, that blob is written out to the temp directory, probably using the given filename. The system then "executes" that file, using the association connected to the particular extension and, when the application terminates, the temp file is deleted. This mechanism can be readily used, for example, to play .wav files, or show .bmp files, and so on, but is open-ended, that is, extendible, to the extent that there is a registered handler for each extension.

It will be noted that other types of RC fields may implemented in other embodiments of the present invention, possibly using other mechanisms for starting programs. For example, instead of a self-contained blob, a program can be initiated by means of a specific command line, such as a pre-existing filename or URL, or a COM object may be specified to be loaded and run.

3) DeleteValue(Key as String): This process deletes an existing key/value pair.

4) FlushToFile(Name as String): This process encodes the list of key/value pairs, and writes it to the specified file, removing the existing Appendix 14 if there is one. If the named file doesn't exist, the file is created with only an Appendix 14, that is, without a Graphic 12.

In addition to the above described processes, certain decoding processes, such as KeyCount, KeyName, Value, QueryValueType, are available to Encode Algorithm Processor 84 for use on a VLO 10 being encoded and have interfaces identical to those used in Decoder 52. These processes operate on the state of data currently existing while the encode operations are continuing.

5) AddFileValue(key As String, Filename As String, Optional myType As String=""): This process provides a special wrapper for AddValue( ), described above, which permits a developer to directly specify a binary file as binary data without having to explicitly read the file into a byte array. The binary data involved is not read into any buffers until the FlushToFile( ) call is issued, so that the file must still exist at that time. This process may be used with a keyname of __HEADER__, which results in the binary file containing the binary data being specified as the Graphic 12 component of the VLO 10.

6) FileValue(key As String) As String: This process is active only if the value was created using AddFileValue( ) and, if this condition is met, this process retrieves the filename.

Finally with respect to the ordering of keys and relationship between keys, it should be noted that each key field is unique because writing a new value with the same key automatically deletes the previous value. It should also be noted that the keys are essentially unordered, although for some purposes, such as the right-click menu, the order of the keys will affect the order in which the user sees the menu choices. For that and similar purposes, therefore, the presently implemented rule for ordering of keys is that each time a new key is added, and if the key already exists, the already existing key is first removed from the list and the new key is then added to the end of the list and, if the key does not already exist, the new key is added to the end of the list.

Finally, it should be noted that in the presently preferred embodiment of the invention certain keynames are reserved for specific purposes or functions. Among these are:

"END" is a keyname reserved for data integrity checking, and is otherwise not visible except within Encode Algorithm Processor 84;

"__HEADER__" is a special key refers to the file header and the value is a filename, as described above with respect to AddFileValue( );

"BLURB", "MICROHELP" and "TITLE" are keys are used (in that order) for tooltips, that is, the text that appears at the location of the mouse cursor when using Decoder 52;

"URL" is treated specially for navigation related events, as described previously;

"VLOID" is a unique identifier (ID) used to distinguish a particular VLO 10 from another VLO 10 that might happen to have the same name and/or key contents. VLOID is analogous to a GUID, but more so to the VSN (volume serial number) stored on a floppies when it is formatted. VLOIDs are generated randomly, based on date/time probably, when the method FlushToFile( ) is called, so that the only way to see what value was used for a VLOID is to read the VLO 10.

"ExpDate" is an expiration date and time, generally encoded as 12 ASCII digits, "yyyymmddhhmm" and the use or non-use of "ExpDate" is specific to a given implementation, although it will be recognized that "ExpDate" could be implemented as an explicit feature of the system. If the current date and time is later than the expiration date and time, many features of the VLO will operate differently from normal or will be disabled. For example, the Drag/Drop and "JUMP" operations will be disabled, as may be at least some right-click menu option. In the present embodiment, the program, process or container opening a VLO 10 must check the Expiration Date properties of the VLO 10, and decide how it wants to handle the VLO 10, although no special methods or events are needed in the present embodiments of the invention.

B. Decoder 52 (FIGS. 6A and 6B)

Figure 6A:
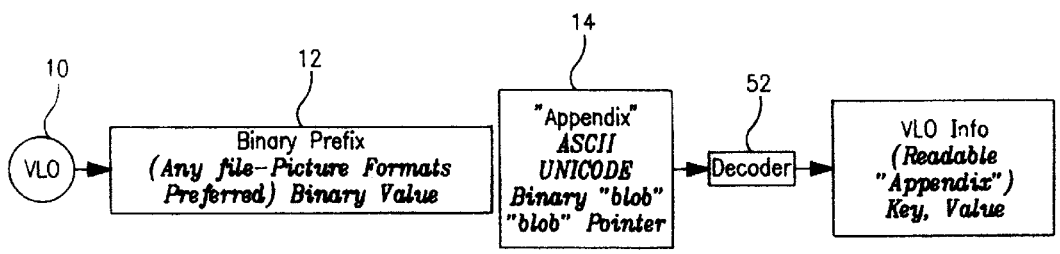
FIGS. 6A and 6B are flow diagrams illustrating the operation of a decoder for reading visual link objects.
Figure 6B:
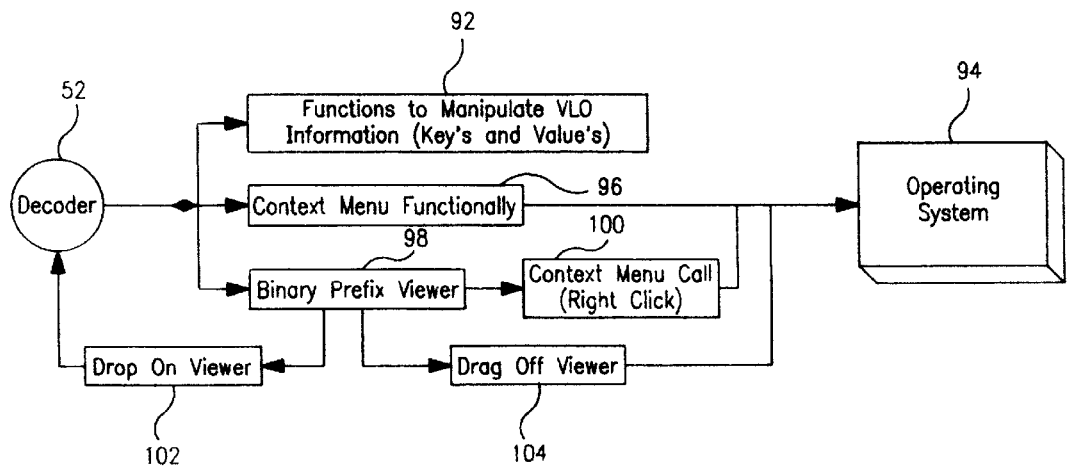

Referring to FIG. 6A, it is shown therein that the principle function of Decoder 52 is to read and extract the contents of a VLO 10, that is, the Image 12A residing in Graphic 12 and the contents of the components of Appendix 14, and to provide Image 12A and the contents of Appendix 14 for display and for use in electronic commerce functions by a user of the system. For this purpose, and as illustrated in FIG. 6B, Decoder 52 provides a set of functions and methods, designated as VLO Manipulation Functions 92, for manipulating and performing operations with the previously described keys and values of Appendix 14. Decoder 52 further includes a set of functions that interoperate with, for example, an Operating System 94, to perform functions related to the use of VLOs 10 in electronic commerce operations. These functions include Context Menu Functions 96, for performing menu selectable operations on or with VLOs 10 and a Binary Prefix Viewer 98 for display and viewing of the Image 12A of a Graphic 12. As previously described, a Context Menu Call Function 100 may be associated with Binary Prefix Viewer 98 for performing inherent, autogenerated "right click" menu operations and Context Menu Call Function 100 may also support Drop On Viewer 102 and Drag Off Viewer 104 functions whereby VLOs 10 may be displayed, and VLO 10 related operations initiated, by "dragging and dropping" a VLO 10 onto and off of a graphical representation of, for example, a viewer, a credit card or other related functional representation.

In the presently preferred embodiment, Decoder 52 is implemented by program control of a general purpose processor, such as a CPU 36. As such, the functional and structural properties of Decoder 52 may be described by the functions, processes and methods executed by Decoder 52 and by its interfaces to VLOs 10.

Before discussing the functions, processes and methods executed by Decoder 52, the basic structure of VLOs 10 should be reviewed. As has been described, in the presently preferred implementation a VLO 10 file format is encoded.

A key name has approximately the same constraints as a filename and is presently implemented as a 7 bit ASCII string that is not case-sensitive, and may include period, dollar signand @ symbol. A keyname presently may not have embedded spaces, commas, parentheses, brackets, or similar characters, and the backslash is a reserved character for possible multi-level encoding in alternate versions, for example, for use in multi-level right click menus.

The key value is terminated by the equals-sign of the type field, which is delimited by equals signs and contains one or more added characters, of which the characters "=T=" - text, "=B=" - binary, and "=R=" - right-click are defined in the present embodiment. All types that begin with a digit or letter other than "Z" are presently reserved for planned extensions, with "Z" being reserved for third party extensions, such as "=Zdecbinary".

Size is stored as 7 bits per byte with the lowest order byte first and the high-bit on state reserved to identify the last byte used, so that while size is usually encoded in a single byte field, there is no defined or specified limit on the size of a field other than those set by practical considerations.

The form of the data residing in the data field is either Unicode or binary in the present implementation, depending on the type field. Unicode data is presently compressed, using a scheme called UTF8, so that all English printable text will take up one byte per character. The full Unicode character set is available, however, in the present implementations.

The functions, processes and methods executed by Decoder 52 and by its interfaces to VLOs 10 presently include:

1) VLOname( ) as String: This function defines and identifies a VLO 10 by filename, loads the identified VLO 10 file, and decodes and loads the VLO 10's Appendix 14 data;
2) KeyCount( ) as long: This function determines the number of unique key values in a VLO 10 list of key values.
3) KeyName(Index as long) as String: This function identifies the key name for a particular item in a VLO 10 list;
4) Value(Key as String) as Variant: This function gets the value for any key in a VLO 10 and returns the value as either a text string or a byte-array; and
5) QueryValueType(Key as String, byref type as String, byref size as Integer):This functions finds the type and size of a given value in a VLO 10.

Other functions, processes and methods executed by Decoder 52 and by its interfaces to VLOs 10 may include:

6) BackColor( ) As ColorConstants: This property allows the background color of the control to be set;
7) ToolTipText( ) As String: This property specifies what graphic, image or symbol will be displayed when the mouse cursor is positioned over a displayed control function, such as a button or menu pick;
8) Dragmode( ) As Integer: This property is read-only and unreferenced and is unused in the present embodiment of the invention but relates to "drag and drop" functionality;
9) Size( ) As Integer: This property is unused in the present embodiment and is thus unreferenced by any function but is reserved for potential use;
10) Tag( ) As Variant: This property is unused in the present embodiment but provides storage for data to be determined in the future and is thus reserved for future use; this property is also a Visual Basic convention;
11) Enabled( ) As Boolean: This property specifies whether a related control function or value has the keyboard focus or not and, if it does, the Ctrl-C command will result in copying of the selected list-box item to the clipboard;
12) AutoResize( ) As Boolean: This property controls whether a related control, such as a "button", changes size when a new picture or image is displayed;
13) ButtonVisible( ) As Boolean: This property controls whether a related window-shade button is visible and, if the button is not to be displayed, the related control code is disabled as well;
14) DropFlag( ) As Long: This property controls whether Microsoft Windows OLEdragdrop supports this control as a target. If vbOLEDropNone, then there is no support for OLE drop events. If vbOLEDropManual, then a drop event is passed to the container with no action by Decoder 52. If vbOLEDropAutomatic, then the dropped file is loaded into the VLO 10, and then the event is passed to the container; and,
14) Copyrightnotice( ) As String and Expired( ) as boolean: These properties have been discussed above.

Certain events are recognized by or generated by the operation of Decoder 52 and, in the present implementation in the Microsoft Windows environment, include:

1) Event Click( ): raised when the user presses and releases the mouse within a small region;
2) Event Jump(URL As String): raised when the user presses and releases the mouse within a small region if there's a non-blank URL key in the current VLO 10;
3) Event KeyPress(KeyAscii As Integer): raised when the user presses a keystroke while a picture has the keyboard focus;
4) Event NewVLO(name As String): "dragdrop" has changed the filename raised upon an OLEdrop event, assuming that DropFlag is true;
5) Event OLECompleteDrag(Effect As Long): raised when a picture box gets an OLECompleteDrag event; and
6) The generally used and implemented events Event Resize( ), Event DblClick( ), Event KeyDown (KeyCode As Integer, Shift As Integer), Event KeyUp (KeyCode As Integer, Shift As Integer), Event MouseDown(Button As Integer, Shift As Integer, x As Single, Y As Single), Event MouseMove(Button As Integer, Shift As Integer, x As Single, Y As Single), Event MouseUp(Button As Integer, Shift As Integer, x As Single, Y As Single), Event MouseOver(Button As Integer, Shift As Integer, x As Single, Y As Single), Event DragDrop2( ), Event OLEDrag( ), Event OLEDragDropEncodeOnly( ), Event OLEGiveFeedback( ), Event OLESetData( ), and Event OLEStartDrag( ).

Finally, it is well known and understood that each data item in a networked system will typically have associated with it an address or other means by which the source or residence of the data item in the network is identified. For example, in the networked system in which the present electronic commerce system is implemented, that is, in the World Wide Web (WWW) constructed and operating on the Internet, the source and residence of each data item, whether a HTML document or page or a VLO 10, has associated with it a Universal Resource Locator, or URL, identifying the system, such as a Server 30B, that was the source of the page or VLO 10. As such, each VLO 10 communicated from the Server 30B to a Buyer 32 will have associated with it a URL that identifies the system, that is, Server 30B, that provided the VLO 10 and, typically, a location or address within that Server 30B. It will be appreciated that the linkage between VLOs 10 and the corresponding URLs identifying the sources of the VLOs 10 are of significance in managing the VLOs 10 in a Buyer 32 and in carrying out electronic commerce operations. As such, it will be understood that Decoder 52 will also include methods to aid in managing VLOs 10 and the corresponding URLs as necessary.

C. Shopper 54 (FIG. 7)

Figure 7:
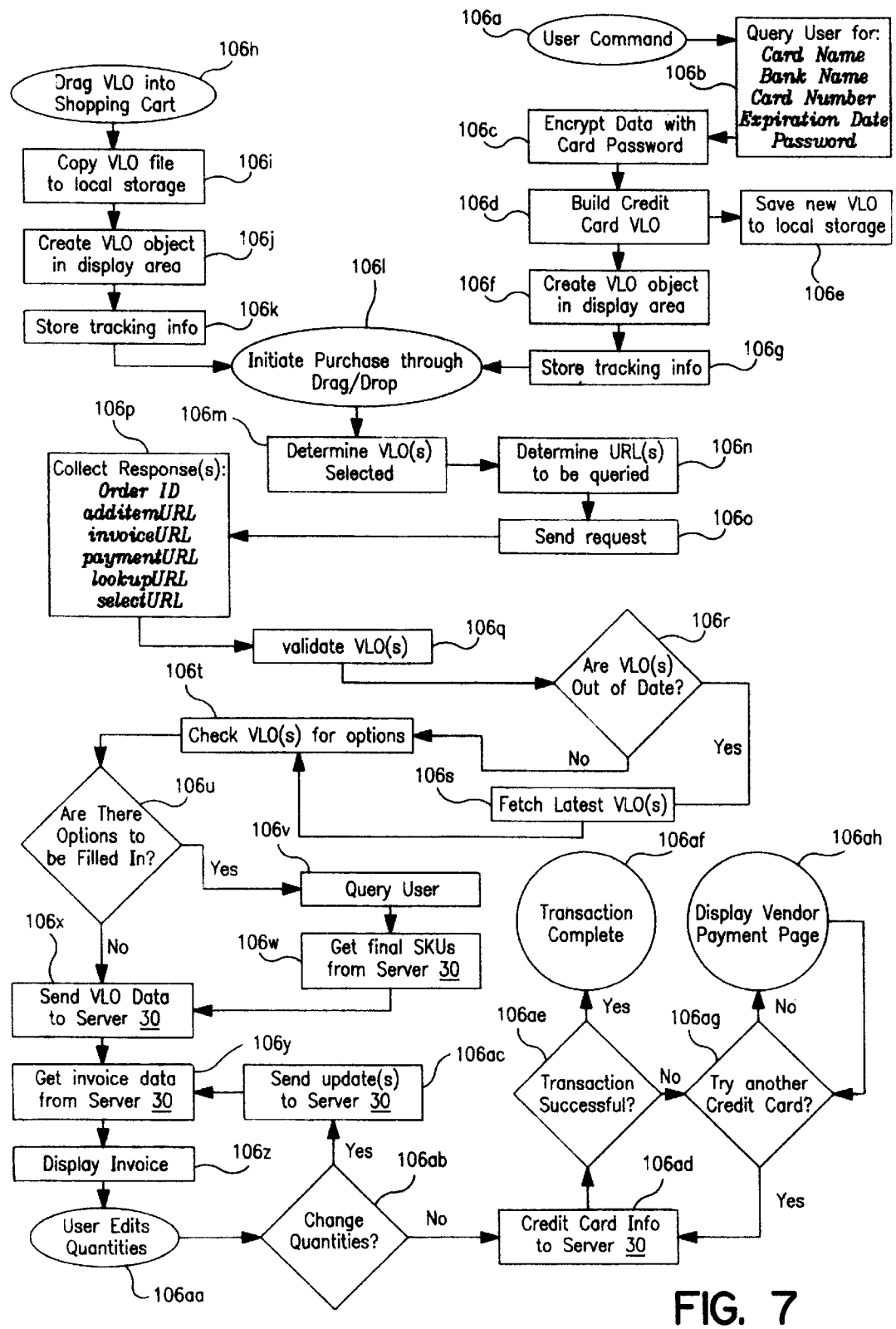
FIG. 7 is a flow diagram of the operation of a system for executing a business transaction through visual link objects.

Referring now to FIG. 7, therein is shown a flow chart illustrating the structure, operation and functions of a Shopper 54 according to the present invention wherein the functional or operational steps executed by Shopper 54 are indicated by reference numerals in FIG. 7 and corresponding references in the text of the following discussion, such as (106a) or (106d).

As has been discussed with reference to FIG. 4, ECS 48 may include a Shopper 54 which is resident in Buyer 32 and is essentially a facility that may be used by the buyer to organize and facilitate business transactions with VLOs 10. As described, Shopper 54 constructs and displays a Shopper Window 74 having, for example, a Selected VLO sub-window (Selected) 76, a Financial Display Window (Financial) 78, a Special Display Window (Special) 80 and a Text/Help Bar (Text) 82. Shopper 54 uses "drag and drop" functions to drag or copy VLOs 10 selected by the user from a Web Page 66 to Selected 76 where the selected VLOs 10 are retained and displayed for subsequent consideration and actions by the user. The user may, for example, elect to view the information, such as price, color selections, and so on, regarding the item corresponding to a given selected VLO 10, in which instance Decoder 52 operates in conjunction with Shopper 54 to decode and read the information from the VLO 10 and to display the information in, for example, a pop-up sub-window in Selected 76.

The user may visually and functionally organize and group VLOs 10 in the Selected 76 window and in pop-up sub-menus activated, for example, by "right clicking" or by additional "control buttons" located in Selected 76 or Financial 78, may then, for example, allow the user to direct Shopper 54 to e-mail the indicated VLOs 10 or to direct Shopper 54 to calculate the total price, including shipping and taxes, of the items represented by the selected VLOs 10. Financial 78 contains a display of financial matters relating to the user, such as the credit/debit cards available to the user for purchases, the total amounts charged to selected accounts, and credit/debit card information such as account/card numbers, expiration dates and so on. A user may use Selected 76 and Financial 78 together to purchase items corresponding to the VLOs 10 displayed in Selected 76. For example, the user may drag and drop individual or grouped VLOs 10 from Selected 76 to a representation of a credit or debit card in Financial 78, or by indicating the VLOs 10 to be purchased and "clicking" on a credit/debit card representation in Financial 78, and so on. Shopper 54 will display the purchase information relevant to the VLO 10 for the buyer to verify and will then execute the purchase when confirmed by the buyer.

The Special 80 sub-window may, in turn, be used for special purpose display functions. For example, Broadcaster Mechanism 56 may use Special 80 for the display of VLOs 10 "push" downloaded from a Server 30B. Finally, the Text/Help Bar 82 of Shopper Window 74 is used by Shopper 54 to display text messages to the user, such as total cost of items selected, credit card amount charged during the current session, the e-mailing status of packaged VLOs 10, help in using Shopper 54, and so on.

Finally with regard to the following description of the operation of Shopper 54, it should be remembered that, as has been discussed above, the information provided to a buyer by a seller in an electronic business VLO 10 may be presented directly or indirectly. That is, certain information, such as that describing the goods or services offered, may be contained within the VLO 10 and presented directly therefrom to the prospective buyer. Other information, such as order forms, prices, choices among goods or services, and so on, may be represented in the VLOs 10 by addresses or pointers, such as WWW URLs, to the network locations where the actual information resides. In these instances, the information would be presented to the buyer indirectly, that is, by accessing the indicated network address by means of the buyer's browser or other network access facility and downloading the corresponding information. The choice of whether to provide given information directly from within a VLO 10 or indirectly from a network location identified by information contained in the VLO 10 would depend upon a number of factors, such as the volume of the corresponding information, the control the buyer wishes to exert over the information to be presented, and the frequency with which the information is changed or otherwise modified by the seller. In either instance, however, the information is encapsulated within a VLO 10, either directly by being contained within the VLO 10 or indirectly by means of information providing direct access to the information through the VLO 10.

Referring now to FIG. 7, and as may be seen therein, the execution of a commercial transaction for the purchase of goods or services requires the confluence of two bodies of information, as well as the steps necessary to execute a commercial transaction using the two bodies of information. The first body of information pertains to the goods or services being offered through a Server 30B system, as represented by VLOs 10, and the second body of information pertains to financial information regarding the buyer, as represented by, for example, credit card information residing in a Buyer 32 system. It will be appreciated, from the following discussion, that these operations necessary to create or bring together the two bodies of information, and the operations necessary for execution of a purchase by the drag and drop of a VLO 10 using these two bodies of information, are discrete from one another. That is, the operations necessary to create or bring together the two bodies of information do not necessarily lead into one another, or to the purchase of goods or services offered by a VLO 10, and these operations may be executed independently from one another.

First considering the generation and display of financial information or data pertinent to a given user of a Buyer 32 system and that user's execution of electronic commerce transactions, as previously discussed and as illustrated in FIGS. 4, 6A, 6B and 7, the user will initiate (106*a*) the generation of financial data pertinent to that user by command to Shopper 54. Shopper 54 will respond to the command (106*b*) by querying the user for the relevant and necessary financial information. Through, for example, a dialogue between Shopper 54 and the user, Shopper 54 will extract such information as the user's name, the type of credit or debit card and the name of the bank issuing the card, the number and expiration date of the card and, most probably, a password assigned to or associated with the card. Shopper 54 will then (106*c*) encrypt the financial data pertinent to that user, will build one or more financial VLOs 10 for that user (106*d*), such as one VLO 10 for each credit or debit card held by the user, and will save the user's financial VLOs 10 (106*e*) in Buyer 32 system local storage, such as in a Wallet 68. Then, when that user calls Shopper 54, that user's financial VLOs 10 are read from storage and displayed (106*f*), in a Shopper 54 display area, such as Financial 78 display sub-window in Shopper Window 74 and local tracking information, including local storage pathnames and display positioning information, relating to the display of information to the user may be stored (106*g*) as necessary and as convenient or desired in the context of the local system, it being understood that "external" tracking information, such as all URLs, are stored within the VLOs 10 themselves. It will be appreciated that the steps of generating and registering VLO 10s representing a buyer's financial information, that is, steps 106(*a*) through 106(*g*), may be executed either at the time a given buyer wishes to make use of Shopper 54 or previously, such as when a buyer installs Shopper 54 in the buyer's system, and that the financial information may be updated or modified at any time.

Next considering the presentation of goods and services as represented by VLOs 10, as previously discussed and as illustrated in FIGS. 4, 6A, 6B and 7, goods/services VLOs 10 representing the goods or services being offered through a Server 30B are received, stored locally and displayed by Browser 46A and are accessible to Shopper 54 from Browser 46A or directly through Broadcast Mechanism 56. The user may then select certain of the goods/services VLOs 10 displayed by Browser 46A that represent goods or services that the user wishes to at least consider for purchase be dragging and dropping the VLOs 10 into a Shopper 54 shopping cart (106*h*) and the selected goods/services VLOs 10 may then be stored (106*i*) locally to Shopper 54 and decoded by Decoder 52. The selected goods/services VLOs 10 then created, or displayed (106*j*), in a Shopper 54 display area, such as the Selected 76 display sub-window of Shopper Window 74, and local tracking information may be stored as described previously.

The user may then (106*l*) initiate purchase of one or more items or services chosen from among the VLOs 10 represented by the selected goods/services VLOs 10 by any of several possible drag and drop operations that bring together the chosen selected goods/services VLOs 10 and one or more financial VLOs 10 representing the means of payment for the chosen goods or services. For example, the chosen goods/services VLOs 10 may be dragged and dropped onto corresponding financial VLOs 10, or the reverse, or otherwise indicated, such as by pointing and "clicking".

Shopper 54 will then identify (106*m*) the chosen goods/services VLOs 10, and the selected financial VLO 10. As has been described, a VLO 10 may contain information directly, that is, it may reside within the Appendix 14 of the VLO 10, or indirectly, that is, it may be represented by means of network addresses, such as WWW URLs, identifying where in the network the information resides, such as in a Server 30B. In addition, it should be noted that such URLs residing in a VLO 10 may identify not only data or information to be operated upon or with, but routines, programs or processes to perform certain operations required by Shopper 54, and that those routines, programs or processes may reside, for example, in a Server 30B or at some location within the Buyer 32. As such, Shopper 54 will (106*n*) determine the URLs pertinent to the chosen goods/services VLOs 10 from and will then query (106*o*) the URLs of the data or processes identified by URLs in the Appendices 14 of the chosen goods/services VLOs 10 by issuing requests to the addresses identified by the URLs, using, for example, the URL listing processes described with regard to Decoder 52. Shopper 54 will collect the responses of the queries (106*p*), which may include, for example, an order identification, processes, routines or programs to perform certain operations, an invoice form, or a payment form.

Using the "lookup" function, Shopper 54 will (106*q*) will validate the VLOs 10 and (106*r*) examine the expiration dates of the VLOs 10 to determine whether the current date is past the VLO 10 expiration dates. If any VLOs 10 have expired, Shopper 54 will (106*s*) issue a request to fetch the latest versions of the expired VLOs 10.

Having determined that the VLOs 10 being operated with are valid with respect to their expiration dates, or the most recent versions of the VLOs 10 available, Shopper 54 will then read the information in the Appendices 12B of the VLOs 10 to determine (106*t*) whether any options or choices or indicated for any of the VLOs 10 currently being operated upon, and whether any options need to be answered or filled in by the user (106*u*). If options are present or available, Shopper 54 will query the user (106*v*) with respect to the options, using the "select" function (106*w*) to obtain the final SKUs, if any.

After all options have been satisfied, or if there were no options, Shopper 54 will use the "additem" function (106*x*) to add any resulting additional option related information to the VLOs 10 being operated upon.

Shopper 54 will then request (106*y*) invoice data for each chosen goods/services VLO 10 (106*w*) and will display (106*z*) the invoice data for the chosen goods/services, either together or one at a time or a combination thereof, depending upon the particular implementation of this function and such factors as the volume of information to be displayed to the user. The user may edit (106*aa*) at least certain of the displayed invoice information, such as quantities of items, and, if the invoice information has been changed by editing by the user (106*ab*), the Shopper 54 will use the "additem" function (106*aa*) to perform step (106*ac*) to add the changed invoice data to the invoice data.

When the user is done editing the invoice data of the VLOs 10 and there are no more changes to the invoice data, Shopper 54 will pass payment means information, such as data pertaining to a credit card, to the "payment" function (106*ad*), which will then check (106*ae*) whether the transaction is successful, that is, can be completed, and, if so, the transaction is complete (106af). If the transaction was not successful, for example, because the credit card was not accepted, Shopper 54 may try another credit card selected by the user (106ag) and, if that credit card was accepted, will return to step (106ad), and, if the new credit card was not accepted, may display (106ah) the vendor payment page to the user to inform the user of what provisions may be made to complete the transaction, such as acceptable credit or debit cards or alternate methods of payment, whereupon Shopper 54 may return to step (106ag) to propose another method of payment.

D. Broadcaster Mechanism 56 (FIGS. 8A and 8B)

Figure 8A:
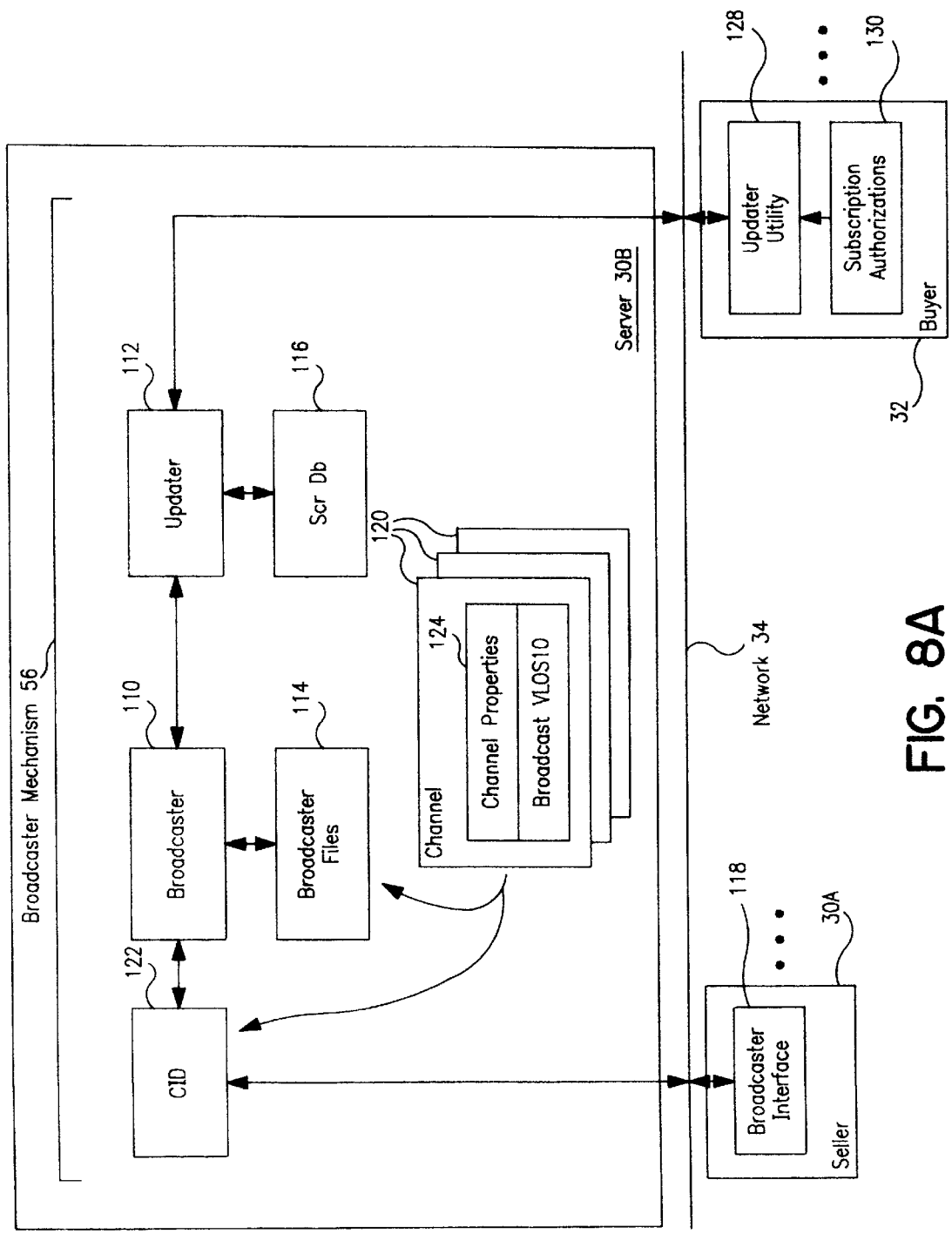
FIG. 8A is a block diagram of a system for subscription distribution of information by means of visual link objects.
Figure 8B:
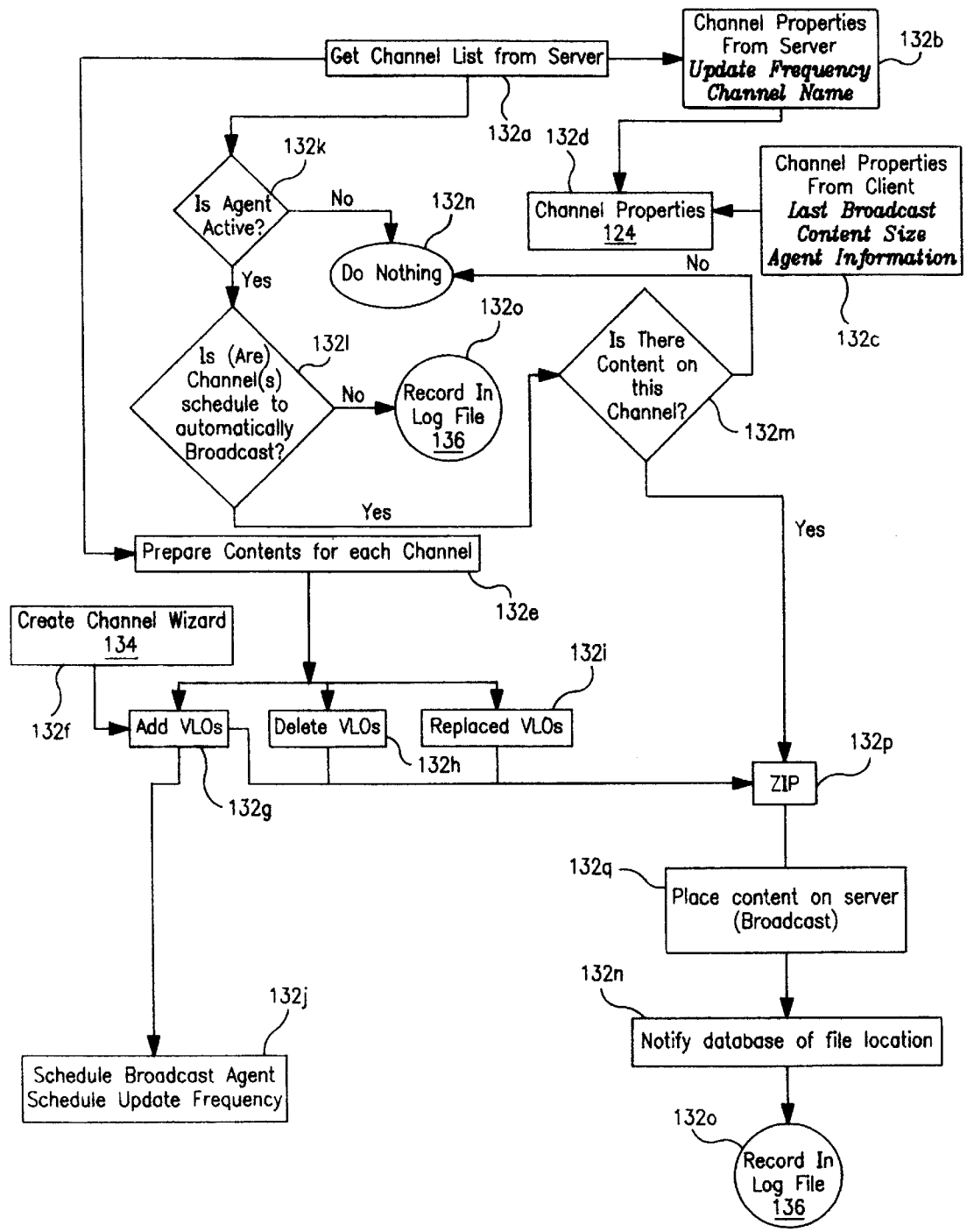
FIG. 8B is a flow diagram of the operation of a system for subscription distribution of information by means of visual link objects.

Referring now to FIGS. 8A and 8B, therein are respectively shown a block diagram of Broadcaster Mechanism 56 and a flow diagram of the operation and functions of a Server 30B resident component of Broadcaster Mechanism 56.

As discussed with reference to FIG. 4, Broadcaster Mechanism 56 includes components residing in Server 30B that interact with a Seller 30A and a Buyer 32 to load VLOs 10 from a Seller 30A to a Broadcaster Mechanism 56 database in Server 30B and to then broadcast, or download, broadcast VLOs 10 to a Buyer 32. Broadcast VLOs 10 are downloaded to a Buyer 32 on the basis of "subscriptions" by a given Buyer 32 to selected "channels" wherein a "channel" is a time varying set or group of VLOs 10 having a commonality of subject matter as represented by the contents of the VLOs 10 of the channel. A Buyer 32 subscriber to a given channel or channels is authorized or enabled to receive the broadcast VLOs 10 broadcast through those channels, which are detected by Decoder 52 and passed to Shopper 54. The broadcast VLOs 10 may be decoded and examined by a user through operation of Decoder 52, in the manner of other VLOs 10, and, depending upon their contents, may be opened to retrieve their contents, to download subject matter referred to in their contents, or used for the purchase of items.

As illustrated in FIG. 8A, Broadcaster Mechanism 56 includes a Broadcaster 110 and an Updater 112 residing in Server 30B wherein a Broadcaster Files 114 are associated with Broadcaster 110 for storing broadcast VLOs 10 and a Subscription Database (ScrDb) 116 is associated with Updater 112 for storing Buyer 32 subscription information. As indicated, one or more Sellers 30A may communicate with Broadcaster 110 through Network 34 to load broadcast VLOs 10 into Broadcaster Files 114, and one or more Buyers 32 may communicate with Updater 112 through Network 34 to receive subscribed for channels of broadcast VLOs 10.

Referring first to the interaction of a Seller 30A with Broadcaster 110, a Seller 30A includes a Broadcaster Interface 118 that provides communication with Broadcaster 110, typically using, for example, a standard network communication protocol, and a user interface to the user of Seller 30A. Seller 30A may typically also include an Encoder 50, DBWiz 64 and DB 62, or an equivalent facility, for the construction of broadcast VLOs 10 for one or more Channels 120 that are stored in a Channel Input Directory (CID) 122 that may reside in Seller 30A or Server 30B. In the present example, CID 122 is shown as residing in Server 30B for purposes of illustration as CID 122 is typically shared by a number of Sellers 30A and will typically be accessed by Broadcaster 110 more frequently than by a Seller 30A. A CID 122 may be associated with and may reside in a given Seller 30A, however, in certain circumstances, such as when the Seller 30A has a relatively high volume of broadcast channel content and frequently alters the contents of the broadcast channels. In such instances, Broadcaster 110 will access and read the Seller 30A resident CID 122 in the manner described below, but will do so through Network 34 using an appropriate communication protocol.

In the present implementation, a user of Seller 30A may update the contents of Channels 120 through Broadcaster Interface 118 by first submitting an authorization to modify one or more Channels 120 and the Channel Properties 124 of the corresponding Channels 120. If the user has the correct authorization, the user may delete outdated broadcast VLOs 10, add new broadcast VLOs 10, replace existing broadcast VLOs 10 with updated or modified VLOs 10, and alter the Channel Properties 124 of the corresponding Channels 120. As described, the new or updated VLOs 10 may be created by the user of Seller 30A, using an Encoder 50, DBWiz 64 and DB 62 or an equivalent facility or may be obtained from elsewhere, such as a service for creating or modifying broadcast VLOs 10. The Channel Properties 124 that may be updated or modified by a user of Seller 30A may include, for example, data describing or defining all pertinent characteristics of each of Channels 120, including, for example, definitions of the content of each Channel 120, the frequency or interval with which each Channel 120 is to be updated, the time of the next update of Channels 120, and whether the content of a Channel 120 has been updated. Channel Property 124 data may also include information pertaining to the currently authorized subscriptions to Channels 120, including, for example, currently active authorization codes identifying or corresponding to the users of Buyers 32 holding currently valid subscriptions and the Channels 120 that each such subscriber may currently access.

Broadcaster 110 will scan CID 122 according to the defined update intervals or times to determine whether a channel has been updated and will read the deleted, added or updated broadcast VLOs 10 and updated Channel Properties 124 of any Channels 120 that have been updated. In this regard, and as represented in FIG. 8A, each of the Broadcaster Files 114 corresponds to a Channel 120 and contains the broadcast VLOs 10 of the corresponding Channel 120 as well as certain of Channel Properties 124, such as information pertaining to, for example, the frequency or period to time the corresponding Channel 120 is to be updated. Upon scanning CID 122, and upon detecting that a Channel 120 has been updated, that is, either the contents of the Channel 120 or the Channel Properties 124 of the Channel 120 have been modified, Broadcaster 110 will modify the corresponding Broadcaster Files 114 accordingly by deleting broadcast VLOs 10 that have been deleted, inserting new broadcast VLOs 10, replacing broadcast VLOs 10 with updated or modified broadcast VLOs 10 and updating the Channel Properties 124 stored therein.

It will be noted that certain of Channel Properties 124, such as the time of last broadcast of VLOs 10, that is, the time of the last update of Channels 120, are stored in ScrDb 116, and Broadcaster 110 will store pertinent changes to Channel Properties 124, such as the time of the latest update, in ScrDb 116 accordingly. Broadcaster 110 will also update ScrDb 116 to reflect, for example, changes in subscriptions, such as adding new or changed subscription authorization codes or deleting or invalidating expired subscriptions and updating ScrDb 116 to indicate that new content, that is, new Broadcast VLOs 10, are available in corresponding Channel 120.

Referring now to the interaction of a Buyer 32 with Updater 112, when a user of a Buyer 32 having a subscription to one or more Channels 120 accesses Server 30B, an Updater Utility 128 residing in Buyer 32, typically as a part of Shopper 54, will transmit a Subscription Authorization 130 which has been provided to the user by a Seller 30A to Broadcaster 10 through Browser 46A and Network 34 wherein a Subscription Authorization 130 identifies the user and the Channels 120 that the user holds authorized subscriptions to. As described, certain subscriptions may be "free", that is, available to any user of a Shopper 54, while others may be "paid for" subscriptions whose validity is dependent upon payment in some manner or the authorized use of a component or add-on to Shopper 54 or a specific version of a Shopper 54, such as a Shopper 54 specifically designed and adapted for use by children.

Upon receiving a Subscription Authorization 130, Updater 112 will first confirm the Subscription Authorization 130 and the Channels 120 the subscriber is authorized to access by comparing the Subscription Authorization 130 with the current subscription information and authorization codes in ScrDB 116. Upon confirmation, Updater 112 will access ScrDb 116 to determine whether there is updated content in any Channel 120 that the user is authorized to access and, if there is updated content, will access the corresponding Broadcast Files 126 and will transmit the updated broadcast VLOs 10 to the Buyer 32 through Network 34. As has been described, the Buyer 32 will receive the updated broadcast VLOs 10 through Browser 46A and the user may view and examine and act upon the new broadcast VLOs 10 as appropriate to the contents of the broadcast VLOs 10 and the terms of the subscriptions.

It will be apparent from the above description of Broadcaster Mechanism 56 that the primary functional and administrative component of Broadcaster Mechanism 56 is Broadcaster 110, which administers the updating of the contents of the channels by Sellers 30A and the delivery of update channel content to the subscribers. Referring now to FIG. 8B, therein is illustrated a flow diagram of the operation of Broadcaster 110 with regard to the broadcasting of broadcast VLOs 10 to subscribers, that is, making updated channel content available to the subscribers. Again, the functional steps executed by Broadcaster 110 are referenced by reference numbers of the form (132a–132ab and so on) in the FIG. 8B and in the following discussion.

As indicated in FIG. 8B, Broadcaster 110 will (132a) read a list of Channels 120 that are scheduled to be updated from CID 122 at the scheduled update time and will (132b) scan CID 122 and (132c) ScrDb 116 to (132d) obtain the current Channel Properties 124 for use in the following steps, as has been described above.

Seller 30A will (132e) prepare the updated contents for each updated Channel 120, that is, the new, deleted or replacement broadcast VLOs 10 and place the new content in CID 122. Broadcaster 110 will (132f) create a Channel Wizard 134, that will create the added (132g), deleted (132h) or replacement (132i) broadcast VLOs 10 for Broadcast Files 126 accordingly, and will (132j) schedule the next broadcast, that is, update of broadcast VLOs 10 available to the subscribers. In this regard, it will be noted that "deleted" broadcast VLOs 10 are not actually broadcast VLOs 10, but are instructions or directions identifying those previously existing broadcast VLOs 10 that are to be deleted from Broadcast Files 126.

Broadcaster 110 will determine whether (132k) the "agent", that is, Broadcaster Mechanism 56, is active, that is, engaged in the broadcasting functions, whether (132l) there are Channels 120 scheduled to be broadcast, and whether (132m) there is new content to be broadcast, that is, to be made available to subscribers. If the determination at either of steps (132k) or (132m) is "no", then Broadcaster 110 will (132n) no nothing as there is no purpose to completing the broadcasting functions. If the determination at step (132l) is "no", then the fact that no channels are scheduled for broadcasting will be recorded (132o) in a history Log File 136 associated with Broadcast Files 126.

If the determination in each of steps (132k), (132l) and (132m) is "yes", the update broadcast VLOs 10 provided from steps (132g), (132h) and (132i) will, in the presently preferred embodiment, be "ZIP" compressed (132p) and placed (132q) in Broadcast Files 126 for subsequent transmittal to subscribers. Broadcaster 110 will also update ScrDb 116 (132r) to indicate that new channel content is available for the subscribers, and update Log File 136 (132s) to record that these actions are completed.

Before continuing, the updating of the content of channels by Sellers 30A should be considered in a more general manner than as described above as there are several options and considerations to this process. As described, the server of channel content holds, at any time, and for each channel, a set of VLOs 10 that comprise the contents of the channels. While every channel is initially empty at some time zero, there are events that change the contents of the channels, including the addition and deletion of VLOs 10 and the replacement of VLOs 10, where a replacement is a deletion followed by an addition. In principle, the contents of a channel can be recreated at any time by emptying the channel, that is, deleting every VLO 10 therein, and re-enacting the complete history of the events that changed the contents of the channel, if such a history has been retained. Alternatively, the current state of the channel, or its state at some earlier time, could by recreated by reinstating the last and latest complete "dump", that is, backup record, before that time, provided such backups have been recorded, and re-enacting the channel's events from that point forward to the time in question. Apart from recovery from errors, complete dumps or event logs may or may not be necessary, depending on the methods used for updating the Seller 30A's copies of the channels to match those of the Server 30B copies of the channels.

It must be noted that the "set of VLOs 10 in a Seller 30A's channel" will often and generally refer to a set of pointers to a master store of VLOs 10 that contains one and only one copy of every version of every VLO 10 that is or has been part of the contents of a channel. If and when a VLO 10 is updated to a new form, and even through the VLO 10 may retain the same "name", the VLO 10 will be assigned a new identity wherein the identify may, for example, be of the form "name" plus "date/time stamp". In this regard, it should be recognized that VLOs 10 in the master store may be incremental in form, that is, created as small changes to previous VLOs 10, and may be stored implicitly as the previous version of the VLO 10 plus such edits. In addition, such edits may even be chained if the saving in storage space is more important than the computational overhead in creating a current VLO 10 from the original VLO 10 and a chain of such edits.

From time to time, however, the copy of a channel residing in a Server 30B will be updated so that the contents in the Server 30B mirrors the contents residing in the Seller 30A, and this process may be executed by several methods. In a first method, the Seller 30A may send a channel identifier, such as a channel name, to the Server 30B, together with a list of the identities of the VLOs 10 currently resident in the Seller 30A's copy of the channel. The Server 30B will then compare the Seller 30A's list of VLOs 10 with its own set of current contents of that channel, which is considered the authoritative copy in the present implementation. Server 30B will send to Seller 30A the additions and deletions necessary for the Seller 30A and Server 30B contents to correspond. In the case of deletions, only the identifications of the VLOs 10 to be deleted need be sent to Seller 30A, while for additions both the identification of each VLO 10 to be added and each VLO 10 to be added must be sent to Seller 30A by Server 30B.

In a second method, the Seller 30A will identify itself and a channel to Server 30B and will send to Server 30B the time of Seller 30A's last update to the identified channel, unless the Server 30B tracks the times of updates so that the Seller 30A need only send its identification and the identification of the channel. Server 30B will then recreate an image of the channel after the last update from the Server 30B's backups and event logs, will compare this image with the current contents of the channel, and will send to Seller 30A the additions and deletions necessary for the Seller 30A and Server 30B contents to correspond to the recreated image.

In a third method, the Seller 30A will again identify itself and a channel to the Server 30B and will send to Server 30B the time of Seller 30A's last update to the identified channel, unless the Server 30B tracks the times of updates so that the Seller 30A need only send its identification and the identification of the channel. Server 30B will then, from its backups and event logs, identify the point in its history corresponding to the most recent previous update and either send to the Seller 30A all events from that point forward or tell the Seller 30A to delete all content from that channel and download to the Seller 30A all of the Server 30B's current content for that channel, depending upon which method is more efficient.

Finally, the Seller 30A may delete all content from a channel and ask the Server 30B to initialize the channel, that is, to send the complete contents of the Server 30B's copy of the channel to the Seller 30A as additions to the Seller 30A's copy of the channel. This method may be the preferred method if the previous update was a sufficiently long time in the past or if the user of Seller 30A doubts the integrity of the Seller 30A's copy of the contents of the channel.

It is apparent, therefore, that each of the above methods offer different combinations of speed, security and efficiency and a Seller 30A and Server 30B may chose among these methods for any given instance of a channel update, depending upon the circumstances of the update.

E. Saver 58 (FIG. 9)

It has been described above that Saver 58 is in many respects conventional screen saver typical of those common used in the Microsoft Windows type operating environment, and as such will be well understood by those or ordinary skill in the arts without further detailed description. Saver 58, however, is adapted and designed to display VLOs 10, that is, the Images 12A of VLOs 10 and to allow a user to purchase goods and services represented by the VLOs 10 by direct invocation of the VLOs 10 displayed by Saver 58. For this purpose, Saver 58 is connected from Decoder 52 so that Decoder 52 may transfer single VLOs 10, such as those received through Broadcaster Mechanism 56, to Saver 58 for display. Unlike the display of VLOs 10 in the Special 80 area of Shopper Window 74, however, the VLOs 10 transported to Saver 58 are retained and stored in Saver 58 or, for example, in MSD 40, for continuing display by Saver 58. In addition, the VLOs 10 displayed by Saver 58 may be accessed by a user through Decoder 52 and Shopper 54, if installed in the Buyer 32, and may be used for the purchase of corresponding items in the same manner as those displayed through VLOs 10 in Shopper Window 74, using the user's financial information as stored in Registry 108 and, in the form of financial VLOs 10, in Wallet 68.

Figure 9:
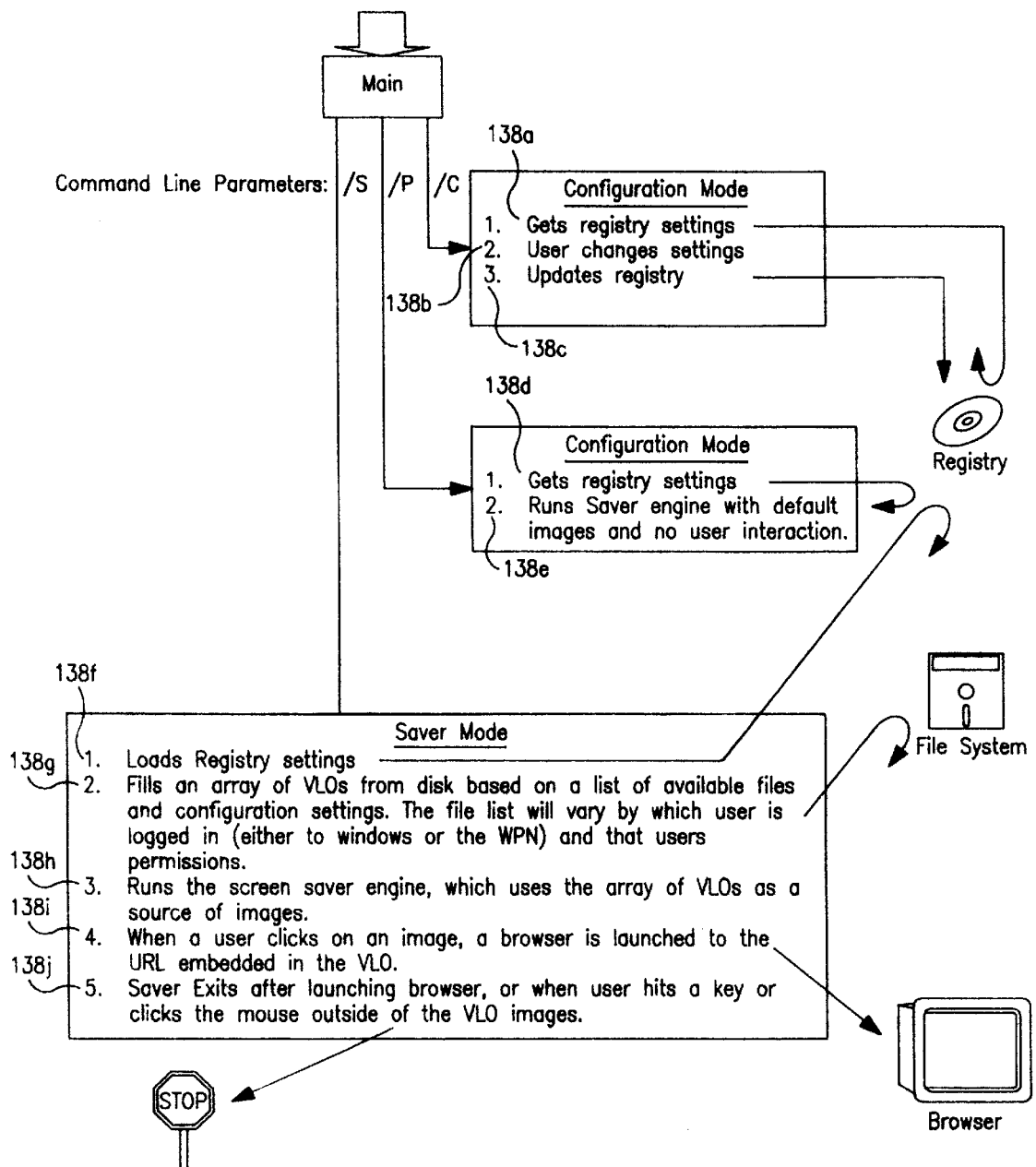
FIG. 9 is a flow diagram of a screen saver utilizing business transaction visual link objects.

Referring to FIG. 9, therein is represented a functional flow diagram of operations of Saver 58 and it will be seen therein that Saver 58 has three primary modes of operation. In the configuration mode, Saver 58 will read (138*a*) the current settings and data pertaining to the user's financial information from Registry 108, will allow the user to change or modify (138*b*) the current settings and data, and will update (138*c*) the user's financial information and data in Registry 108. In the configuration mode, the user also chooses the source for VLOs 10 to be displayed during the screen saver mode, described below.

In the preview mode, Saver 58 will (138*d*) choose the further define the display parameters and will operate as a small scale version of Saver 58 (138*e*), but without user interaction as a test and display of Saver 58 operations.

In the saver mode, Saver 58 will read (138*f*) the current user financial information and data from Registry 108, will fill an array of VLOs 10 (138*g*) to be displayed by Saver 58 wherein the VLOs 10 chosen to fill the array are dependent upon such factors as the current user of Buyer 32 and the VLOs 10 currently available to Saver 58 for display. Saver 58 will then operate as a screen saver (138*h*), displaying the VLOs 10 from the array. Then, when a user "clicks" (138*i*) on a VLO 10 displayed by Saver 58, Saver 58 will "launch" Browser 46A to access the network location, that is, the URL, embedded in the VLO 10 for possible purchase of the corresponding goods or services, using the financial information in the manner described previously with respect to Shopper 56. Alternatively, the clicked-on VLO 10 may be invisibly transferred to the shopping basket or cart for later examination and possible purchase, that is, the shopper may in fact be invoked immediately. Finally, Saver 58 will exit (138*j*) operation as a screen saver, turning operation of Buyer 32 over to, for example, Shopper 56 or Browser 46A, when the user "clicks" outside the Saver 58 display area or activates a keyboard input, in the usual manner of operation of screen savers.

Figure 10A:
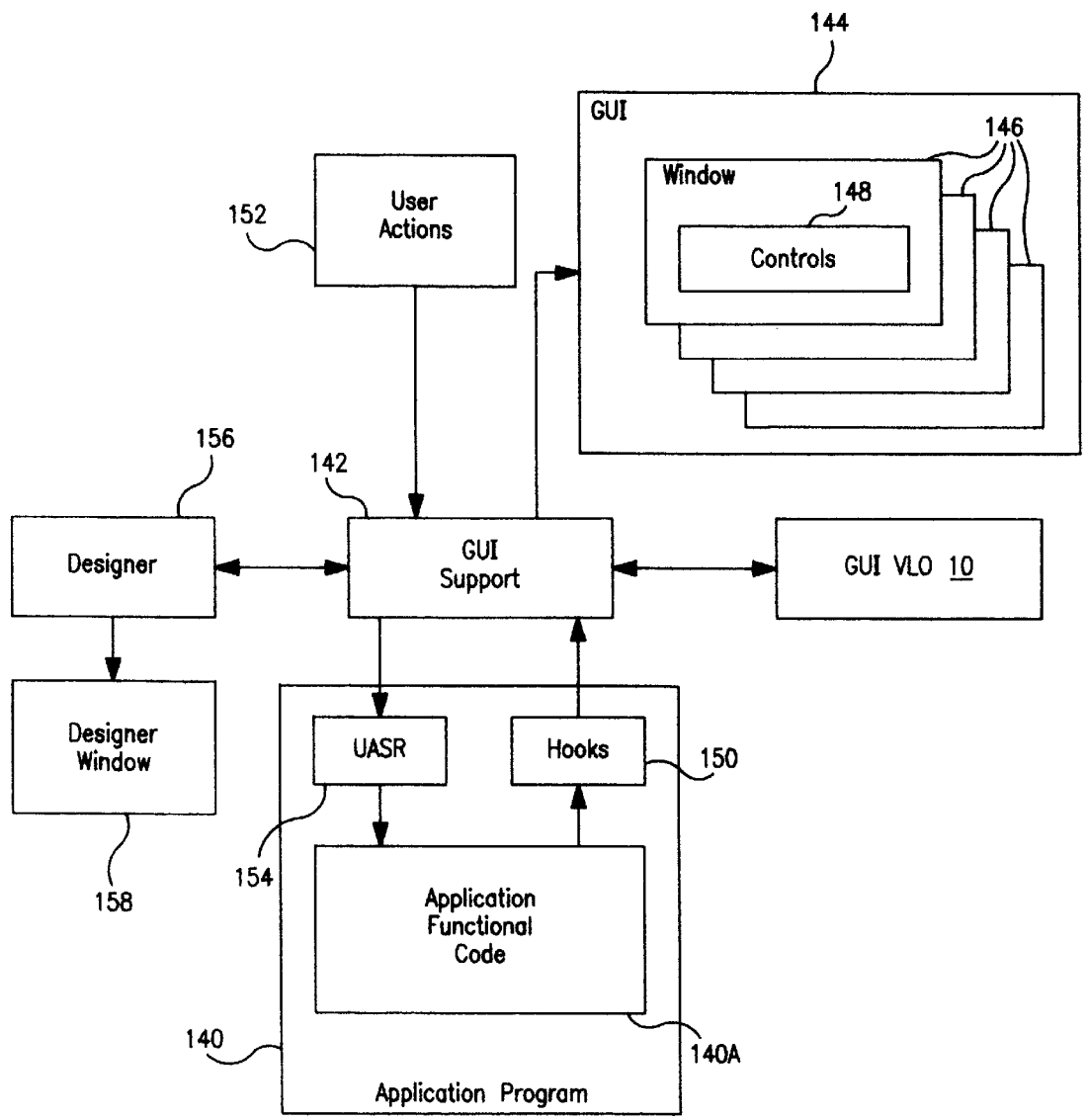
FIG. 10A is a block diagram of a system for constructing visual link objects for distribution of visual link objects containing graphic user interfaces for customization of applications programs.
Figure 10B:
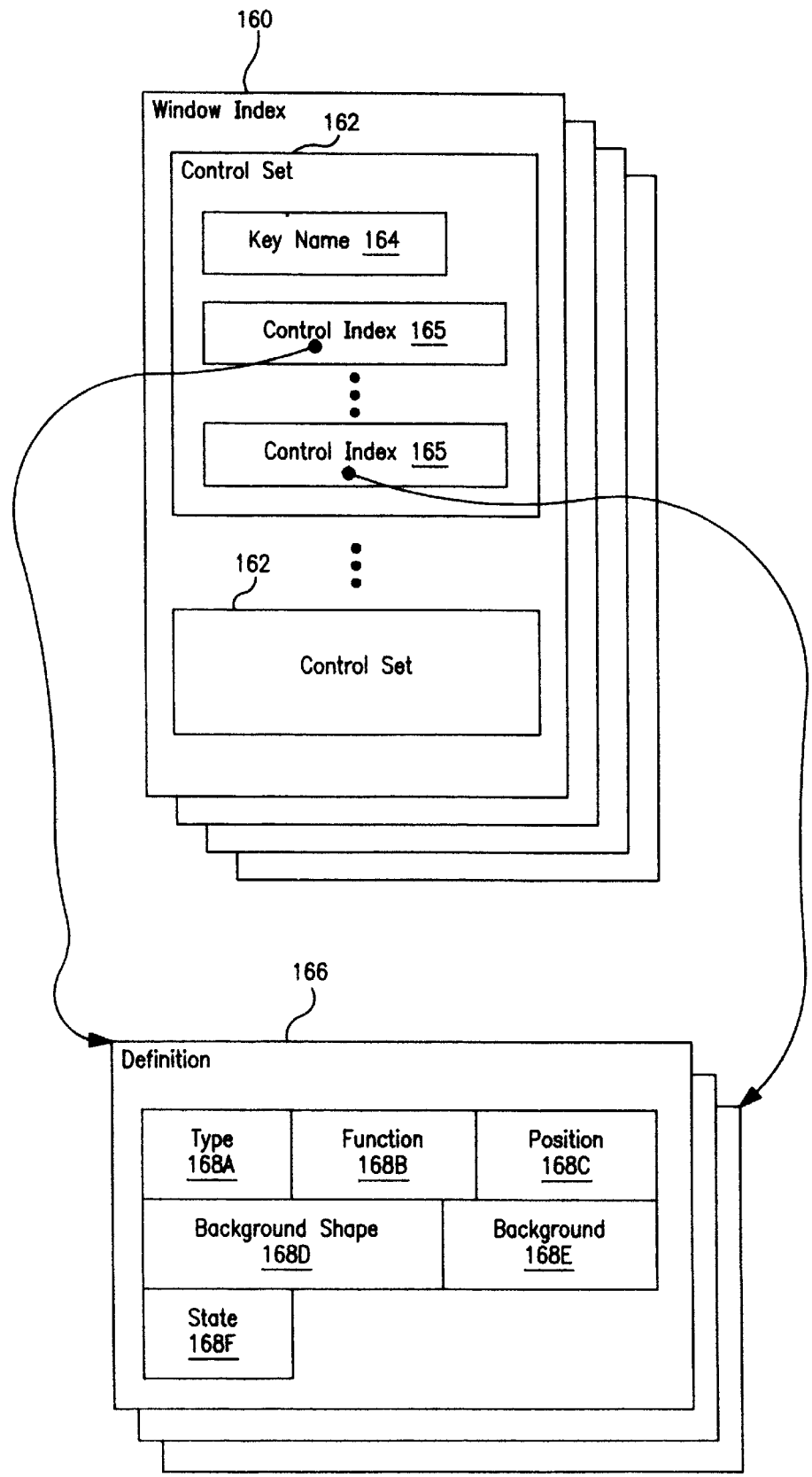
FIG. 10B is a diagrammatic representation of a visual link object containing a graphic user interfaces for customization of an applications program; and, FIGS. 11A through 11D illustrate the multi-level encapsulation of visual link objects, and an alternate embodiment of a visual link object.

6. Graphical User Interface (GUI) VLOs 10 (FIGS. 10A and 10B)

As has been described herein above, a VLO 10 of the present invention as illustrated in FIG. 1 may be used as a self-illustrating and self-describing "container" for the direct or indirect delivery of virtually any form of data or information, including programs and other forms of executable code, as has been illustrated by the above descriptions of electronic business VLOs 10 and broadcast VLOs 10. The following will described yet another form of VLO 10, specifically a graphical user interface (GUI) VLO 10, that is adapted to encapsulate, implement and provide a graphical user interface for an application program and that may be stored or communicated from system to system in the manner previously described.

In this respect, certain applications programs of the prior art have provided some degree of user customization of the graphic user interfaces of the programs. This customization, however, has been essentially limited to defining such relatively minor aspects of a program's graphical user interface as the specific form in which text messages, such as date and time, appear to the user, and background and foreground colors and patterns of the program display/control screens and "controls", such as "push buttons" and "sliders". As will be described, and in contrast to the prior art, GUI VLOs 10 allow the customizable definition of such additional aspects of a program's user interface as the number and types of display windows and the number and functions of all controls, as well as the form of messages and the colors and patterns in which the display/control windows and controls.

The use of GUI VLOs 10 thereby allows the ready customization of an application program user interface by providing alternate GUI VLOs 10 for the application program, thereby allowing both the user interface and the user accessible functions of the program to be customized to different users. For example, a program such as Shopper 54 may be provided with separate adult and children's user interfaces by providing corresponding GUI VLOs 10, each being tailored in its complexity and in its accessibility to program functions accordingly. In further example, a user may be provided with the entire executable code of an application program on a trail basis, with the GUI VLO 10 provided during the trail being a sub-set of the full user interface, thereby limiting the functions available to the trial user. Upon acceptance of the program, and payment, the seller may then provide the full user interface GUI VLO 10 to the user, thereby providing the user with access to the full functionality of the program. The use of trial and full function versions of GUI VLOs 10 thereby avoids many of the problems inherent in trial versions of programs, such as the need to create and delivery two different versions of the program, that is, the trial and full function versions, or to subsequently "patch" the trial version of the program code by delivering and installing the additional code necessary to make the program fully functional.

Referring again to FIG. 1, a GUI VLO 10, like a broadcast VLO 10, is similar in structure to an electronic business VLO 10 and includes a Graphic 12 file containing an Image 12A for visual display and identification of the GUI VLO 10. As will be described further below, a single GUI VLO 10 may define a graphic user interface having single display/control window with one or more controls, or a plurality of display/control windows, each having a plurality of controls. In the presently preferred embodiment, however, the Image 12A displayed by a GUI VLO 10 will be a single image representing the graphical user interface provided by the GUI VLO 10, even if the GUI VLO 10 defines a plurality of display/control windows, and will typically represent the primary control/display window or some other symbolic representation uniquely identifying the user interface provided by the GUI VLO 10.

Appendix 14 will contain data defining a graphical user interface of an application program and, as described, Appendix 14 may include any combination of an Encoded Data Block (EDB) 14A, an Extended Markup Language Block (EMLB) 14B, a Binary Large OBject (BLOB) 14C and a Program Invoke (Prog) 14D. Encoded Data Block (EDB) 14A may contain information fields specific to the purpose and function of the GUI VLO 10 while Extended Markup Language Block (EMLB) 14B may contain information particular to a specific user or creator of the GUI VLO 10. Binary Large OBject "Blob" (BLOB) 14C, in turn, will typically contain the graphic user interface information necessary to construct the user interface defined by the GUI VLO 10. Program Invoke (Prog) 14D will typically contain the information necessary to invoke and activate support routines, described below, to execute the graphic user interface represented by the GUI VLO 10 by, for example, dragging and dropping the Image 12A representing the GUI VLO 10 onto a graphical representation of an application program supporting GUI VLOs 10.

Referring to FIG. 10A, therein is shown a block diagram representation of an Application Program 140 supporting the use of GUI VLOs 10. As illustrated therein, in addition to the Program Functional Code 140A that performs the functions provided by the Application Program 140, Application Program 140 is provided with a GUI Support Module (GUI Support) 142 that contains the program routines and graphics necessary to dynamically build and support a Graphic User Interface (GUI) 144 represented and defined by the current GUI VLO 10. As illustrated, a GUI 144 defined by a GUI VLO 10 may include a plurality of Display/Control Windows (Windows) 146, each of which may contain a plurality of Controls 148, which may, for example, be representations of "push buttons", "sliders", and other control elements of the nature familiar to users of graphical user interfaces.

GUI Support 142 also contains all of the program routines necessary to support all user interaction with the user interface controls provided by the GUI VLO 10, and thereby with Program Functional Code 140A. In order to support these interactions, Application Program 140 is provided with Hooks 150 within Program Function Code 140A wherein there is a Hook 150 for and corresponding to each Control 148 of each Window 146. Hooks 150 operate to link each Control 148 with a corresponding routine of GUI Support 142, thereby essentially linking Program Functional Code 140A's response to each Control 148 input to GUI Support 142's representation of that Control 148. An Application Program 140 may use Hooks 150 to call the corresponding routines of GUI Support 142 to manipulate or modify the visual representation of Controls 148 to reflect user control inputs or actions by Program Functional Code 140A. In the presently preferred implementation of GUI VLOs 10, a library of Hooks 150 is provided with GUI Support 142 for incorporation into Program Functional Code 140A and use by a graphic user interface designer in creating or modifying the user interface defined by a GUI VLO 10.

As indicated, User Control Inputs 152 are passed to GUI Support 142, which in turn passes corresponding inputs to event handling routines of Program Functional Code 140A through a set of User Action Sub-Routines (UAsr's) 154 that match user action inputs to the graphical user interface to the corresponding event handling routines. In the presently preferred embodiment, Program Functional Code 140A will translate values passed to the Program Functional Code 140A event handling routines into values and operations specific to the Application Program 140. For example, a GUI Support 142 output through a UAsr 154 and to Program Functional Code 140A that represents a change in a slider type control will be represented by a value having a range between zero and one. Program Functional Code 140A will then translate this value to extract a value having meaning within the context of Application Program 140, typically by multiplication with a multiplier value.

Finally, the present implementation of GUI VLOs 10 includes a Designer 156 which is provided as a separate "toolbox" that interacts with GUI Support 142, and through GUI Support 142 with Program Functional Code 140A and all Windows 146 and Controls 148 of GUI 144, to design, create and modify the Windows 146 and Controls 148 of GUI 144. As indicated, Designer 156 creates and displays a Design Window 158 to display the current state of the Window 146 of GUI 144 currently being operated upon, thereby allowing a GUI VLO 10 to be created or modified "live" as the application displays the GUI VLO 10. When a particular GUI 144 design is completed, it will be saved and stored in a GUI VLO 10, whereupon the GUI VLO 10 may be provided to the end user of Application Program 140, either with Application Program 140 or subsequently. It is anticipated that unlike GUI Support 142, which is required for operation of Application Program 140, Designer 156 will not be provided to the user of Application Program 140 and GUI VLOs 10, but will be used only during the design or modification of Application Program 140 and the creation of GUI VLOs 10.

Referring now to FIG. 10B, therein is illustrated a diagrammatic representation of the GUI 144 data residing in a GUI VLO 10, typically in BLOB 14C. As shown, the GUI 144 data includes a Window Index 160 for and corresponding to each Window 146 of GUI 144 wherein each Window Index 160 contains a Control Set 162 for each set of one or more Controls 148 appearing in the corresponding Window 146 and wherein each Control Set 162 is identified by a Key Name 164. Each Control Set 162 in turn contains one or more Control Indexes 165 wherein each Control Index 165 corresponds to and refers to a corresponding Definition 166 of a Control 148.

Referring now to FIG. 10B, therein is illustrated a Definition 166 wherein it is shown that a Definition 166 will typically include a Type 168A field containing an identification of the type of Control 148 represented, such as a push button or slider, and may include a Function 168B field containing an identification of the function of the Control 148. A Position 168C field contains an identification of the geo-location of the Control 148 in the Window 146, a Background Shape 168D field contains an identification of the size and shape of a background field for the Control 148, and a Background 168E field contains an identification of a color and pattern for the background field.

GUI Support 142 will read the Definitions 166 of each Window 146 to create the displayed graphic representation of the GUI 144, and will add further information necessary to control the visual representations of the Controls 148 in response to user actions and actions by Application Program 140, such as a State 168F field identifying the current visual state of the Control 148, such as whether a is push button is "depressed" or the position of a slider along its path.

It should be noted that one Control Set 162 will be used to store a Definition 166 of the corresponding Window 146 itself, whereupon the Type 168A field will identify the Control Set 162 as the window. It should also be noted that the Background Shape 168D and Background 168E fields may be used to define what is effectively a sub-window that the corresponding Control 148 is displayed in, thereby allowing the visual display of certain Controls 148 to be enhanced. In this regard, the Background Shape 168D field may contain a reference, such as a pointer, to an image similar to an Image 12A and that such an image may be used to define the background of a Control 148, when the Definition 166 applies to a Control 148, or the shape and image background of a Window 146 when the Definition 166 applies to a Window 146.

Finally, it should be noted that Window Indexes 160 and/or Control Sets 162 need not contain a Control Index 165 for each Control 148 supported by an Application Program 140, or even for each Window 146 supported by an Application Program 140. As such, Window Indexes 160 and Control Sets 162 may represent selected sub-sets of the functions and controls supported by an Application Program 140, thereby allowing the apparent and displayed user interface and functions of the Application Program 140 to be simplified or limited for certain users, as described above. A single version of an Application Program 140 may thereby be tailored to a variety of users, each having different requirements or capabilities or different authorizations as to what actions the users may execute.

7. Additional Applications for VLOs 10

It has been described above that VLOs 10 may be used for a variety of business and electronic commerce functions, such as the offer and sale of goods and services, including goods or services involving user selected configurations of goods and services, the broadcast of offers of goods and services, and subscriptions to goods, services and information. It has also been described that VLOs 10 may be used for the transfer or transmittal of various forms of information, such as graphical user interfaces, computer programs, and published information.

VLOs 10 may be utilized in still further forms of electronic business transactions wherein the terms "business" and "transaction" are intended in a broader sense than the sale of goods or services by a seller and purchase of goods or services by a buyer, as has been discussed above. As will be apparent from the following discussion, these terms are intended to include any communication which may advantageously use VLOs 10 and, in particular, the unique characteristics of a VLO 10 as self contained object that contains and encapsulates both a self-identifying visually displayable graphic and user defined data of virtually any form. Most of these transaction models involve the broadcast, in some sense, of VLOs 10, so that the contained text is further likely to include information as to the intended (targeted) geographic and/or demographic group and the various usages differ in the kind and complexity of steps comprising a complete transaction, the relevant security and privacy issues, and so on.

The first general group of VLO 10 based transactions may be described as ASYMMETRIC multi-party transactions involving at least two parties and possibly involving multiple parties. A first example of such may be referred to as "buyers and sellers", which may possibly also include, as separate or overlapping parties, advertisers, transaction clearers, and fulfillment agents, and is essentially the model already discussed in detail herein above. In these transactions, the seller takes the initiative, creating the VLO 10 and "offering" the described goods or services and the VLO 10 image is essentially a picture of the goods or some representation of the service while the text further describes the goods or services for sale, the price, and so on.

A second example may be referred to as the "want-a-thing" VLO 10 wherein the buyer creates and distributes the VLO 10, saying that "I want to find" a certain kind of thing, such as antique furniture, a used car, an out-of-print book. In this case, the picture may not be of the specific thing that will ultimately satisfy the search, but may be a schematic description, such as a "generic used car"; and the text will likely contain further stipulations, such as an offer of a purchase price or a highest price.

A third example is a more complex version of the "want-a-thing" model that may be referred to as the "bridal shower" model. In this instance, for example, the prospective bride and groom assemble and make publicly available a wish-list of desired presents, that is, a selection of ready-made VLOs 10 representing sellers' goods and friends and relatives recruit themselves as buyers, through site's, or clearing house's, bookkeeping facilities.

A fourth example is the "want-a-person" or "want-a-job" model that uses VLOs 10 to facilitate the mutual introduction of potential employer and employee. In these instances, the employer creates a "want-a-person" VLO 10, using, for example, a generic schematic picture of the person, and the job hunter creates a "want-a-job" VLO 10, possibly using his/her own image as the graphic image. The text, depending upon whether the VLO 10 is a "want-a-person" or "wanta-job" VLO 10, may include the desired or actual qualifications of the prospective employee, the actual or desired rate of pay, and so on. In specific cases, as in a movie or theater scripter's search for an actor/actress to play a specific role, the "want-a-person" VLO 10 may use artist's rendition or example photograph of the desired person. Another variation of the "want-a-person" VLO 10 might be a VLO 10 used to advertise and search for people who are sought "by society", such as criminals, suspects or missing children and would include picture or reasonable rendering of the person wanted, along with appropriate textual information, and may lead to further steps of transaction, such as a reward.

Finally, yet another example may be referred to as the "one-way-advertisement" model that advertises events of various types, such as garage sales, store clearance sales, public performances of all types, museums shows, movies, television specials, and so on. The image might implicitly or explicitly indicate the category of the event, or may be specific to and representative of an event, such as a rendering of Monet's waterlillies to advertise a museum showing of Monet paintings, while the text would provide further details.

The second general group of VLO 10 based transactions may be described as SYMMETRIC multi-party transactions involving at least two parties and possibly involving multiple parties and possibly further facilitated in each instance by an automated or semi-automated clearinghouse that specializes in the particular genre of transaction. A first example of this type of transaction may be referred to as the "barter" transaction wherein either of two parties indicates a desired exchange or trade of goods or services. The Image 12 of the "barter" VLO 10 may, for example, use a split image representing what the creator offers and wants in return, while the Appendix 14 text may provide further details.

A second example could be referred to as the "vacation-home-swap" transaction wherein each party prepares a VLO 10 describing what is offered, including, again, representations of what is offered and what is desired. For example, a "vacation-home-swap" VLO 10 could provide an image representing the offered vacation home and its location and indicating the location of the desired vacation home, while the Appendix 14 text describes what is desired in return and the terms for an exchange. whereby each party agrees to allow the other to use its home for the same specified period. It will be recognized that this transaction is a variation of the "barter" transaction, but requiring the matching of two VLOs 10, each setting forth an offer, and that such transactions may make use of an automated or semi-automated clearinghouse, such as a real estate agent.

Yet other examples would be "personals" VLOs 10 published and used in much the same manner as the "personals" advertisements in newspapers or web sites, and "one-to-many" VLOs 10 used to announce an event of potential interest to a specific group of unidentified persons, such as an announcement of the starting of a club, study group, or so on. It will be recognized that "one-to-many" VLOs 10 are a variation of the "one-way-advertisement" VLOs 10 described above, but at a more personal level.

As has been described above, a VLO 10 is a compact, self contained object that contains and encapsulates both a self-identifying visually displayable graphic and user defined data of virtually any form. As such, it will be recognized that VLOs 10 are uniquely advantageous for communicating, transferring, storing, tracking or otherwise managing data of any type in any circumstances wherein it is advantageous for persons to be able to easily recognize the specific data or class or category of data. For example, and in addition to the business and commercial transactions discussed herein above, VLOs 10 may be used to store and transfer finance and accounting records, orders, inventory records, legal records, and any other of business or legal data. In yet other applications, VLOs 10 may be used to represent and track books, video tapes and recordings in a library, wherein a displayable image of the item is placed in the VLO 10,. and the same application may be made, for example, in video rental stores, automobile parts stores, and soon.

8. Multiple Level Encoding of VLOs 10

It is has been described herein above that VLOs 10 may be and often are preferably encoded in order to protect the contents of the VLOs 10 from unauthorized access or modification. A basic level of encoding has been described above wherein the Image 12 and the concluding sections of Appendix 14, that is, and most significantly, the dataset length, length marker and copyright notice information, were left in their original form. The "dataset", that is, the primary data sections of Appendix 14 following Image 12 and including, for example, EDB 14A, EMLB 14B, BLOB 14C and PROG 14D or some subset thereof, is in some way scrambled or encoded so that a user can only make use of the "dataset" through the use of an appropriate dataset de-scrambler.

In other implementations and in certain applications, however, it may be necessary or desirable to one or more subsequent levels of encoding, referred to hereafter as "encapsulation", and which may be referred to as the "onion" model of encapsulation. In this method of successive encoding, or encapsulation, each successive level of encapsulation is scrambled, or encoded, and subsequently unscrambled, or decoded, separately and independently of the next inner levels of encapsulation and the identity and source of the required decoder for any given level of encapsulation of decoding is revealed only upon decoding, or unwrapping, the next outer level of encapsulation. The operation of such multiple levels of encoding and encapsulation are illustrated in FIGS. 11A, 11B and 11C, which respectively illustrate an original VLO 10, an encapsulated VLO 10 without the addition of a new image, and an encapsulated VLO 10 with the addition of a new image.

Therefore, at the inner or first level of encoding the creator or editor of a VLO 10 may use a specific and perhaps proprietary encoder to encode at least the "dataset" portions of the VLO 10 and inserts, at or near the end of the VLO 10, such as after the dataset-length and length-marker information, a plain text note identifying the encoder used in the first level of encoding, such as "NWVdecod.dll, from www.netwaveinc.com." This information identifies the required decoder and its source, so that if not already available to the user of the VLO 10, the user may automatically or manually obtain the decoder, which may entail a payment, license or other form of agreement or authorization.

The VLOs 10 may then be further encapsulated by one or more additional levels before being distributed or transmitted to the intended recipients. At each additional level of encapsulation at least a significant part of the previously encoded VLO 10, possibly including the graphic image, typically including the previously encoded dataset and almost always including the identification of the decoder required for the previous level of encoding, is additionally encoded with the same encoder or any arbitrarily selected encoder or scambler. This process may be repeated several times, using a different encoder at each level, and, at each level of encapsulation, the identity of the decoder required to decode or unwrap the previous level of encoding is encoded with the new encoded, together with the previously encoded data of the VLO 10. In addition, each successive encoder may add data to the original VLO 10, most usually as non-encoded data appearing at the end of the new Appendix 14 and must before the new appendix length field.

The additional levels of encapsulation may be dependent, for example, on the contents of the VLOs 10 or on the method or routes of distribution of transmission, and may be imposed at any point in the distribution or transmission of the VLOs 10 and by any party in the distribution chain. For example, and as described previously, subscription VLOs 10 may be distributed through subscription service channels by various subscription services wherein each subscription service further encapsulates each month's VLOs 10 with that month's encoding procedure, placing the identification and source of the required decoder at the end of the VLO 10, and possibly encapsulating the VLO 10 image as well as the dataset. The decoder for the month is then automatically available for each paid-up subscriber.

One or more levels of encapsulation may also be imposed by a recipient of the VLOs 10. For example, a public library might be the recipient of subscription VLOs 10, or of books electronically distributed by means of VLOs 10, and may further encode at least selected VLOs 10 to permit decoding of the VLOs 10 only by users with valid passwords provided by the librarian. This additional encapsulation may be imposed, for example, and may include scrambling of the Images 12, to shield children from unsuitable content. Such additional encoding may also be imposed on records and data of all forms in, for example, businesses, military installations or units, legal or law related facilities, and scientific, research or engineering facilities, to prevent unauthorized access to or modification of data and records. Access to the original form of an encoded and encapsulated VLO 10 would require access to and possession of the required decoders, which in turn would require proof of authorization, such as a valid identification, password, proof of membership in an intended and authorized class or group of recipients, a subscription, or other evidence of authorization.

The decoding of multiply encoded and encapsulated VLOs 10 is preferably performed by automatic procedures requiring only the appropriate decoder or decoders and, in some instances, the appropriate decoding keys or passwords and an automatic decoder may be implemented by program control of a processor, such as found in a Buyer 32 system. An automatic decoder preferably includes mechanisms for determining whether a VLO 10 is fully decoded or whether the VLO 10 has additional levels of encoding, identifying the decoder required for the next level of decoding, if necessary, and access to or a means for obtaining the appropriate decoder for remaining levels of encapsulation, if necessary. The mechanism should also include a user interface for, for example, requesting passwords of the user, explaining to the user why the decoding cannot be accomplished, or what additional steps, such as the payment of a fee or acquisition of a license, are required to complete the decoding.

Also, automatic decoding, or unwrapping, of VLOs 10 is facilitated if each encoding note declaring the identity and source of the decoder is standardized and machine-readable and includes a means, such as standardized codes, for indicating whether there is an encoding note and whether the VLO is completely de-coded or requires further decoding. In a presently preferred embodiment, for example, special values may be written into the length-of-prefix image field to indicate whether additional levels of decoding must be performed. In this respect, and as will become apparent from the following descriptions, that any and all of the items added after a length marker, including the otherwise arbitrary "additional legible data," must not contain a sequence that looks like a length marker. Finally, such coding and decoding processes are typically fast and the encoding and decoding programs may typically be small, so that the added burdens of processing time and power and storage space should not be troublesome.

As mentioned above, an encapsulation may add a prefix image, this being, for example, a normal JPEG, GIFF, or BMP image to be displayed and visually represent the encoded VLO 10. The prefix image may serve to hide or obscure the visual material of the original, non-encapsulated VLO 10, for example, from minors or for privacy or secrecy reasons, or for branding or repackaging so as to make the encapsulation evident. Unwrapping or decoding this level of encapsulation requires additional information in the decoding instructions, specifically the length of the prefix image to strip away. Thus, in general, an exemplary original VLO 10, before encoding or encapsulation, may consist of the following:

the original VLO image,
    the dataset,
    the length marker,
    the length-of-dataset,
    the length-of-prefix-image=−1(special: means innermost level), and
    other legible data (author, copyright, . . . ), which is optional, and the original, unencoded VLO 10 may be exported in this form.

When this VLO 10 is first encoded, it contains the above items, but with the dataset encoded and with the addition of decoding instructions, such as the decoder name and source. The encoded VLO 10 than has the form:

the original VLO image,
    an encoded new dataset that includes:
        the original dataset,
        the original length marker,
        the original length-of-dataset,
        the original length-of-prefix-image=−1, and
        the original other optional legible data,
    a new length marker,
    a new length-of-new-dataset,
    a new length-of-prefix-image=0 (means not innermost level),
    the filename of the decoder for this level,
    the source, such as a web address (URL) for the decoder for this level, and
    other new legible data (source, copyright, . . . ), which is optional.

When this or any higher level-encapsulation is further encapsulated, a prefix image may be inserted at the beginning and a new encoder used to encode the entire previous VLO 10, except for the previous image in those cases wherein a new prefix image is not being added. The resulting VLO 10 then consists of the following:

the new (prefix) image, which is optional,
        [note: if a new prefix image is added, encoding of new "dataset" starts here],
    the previous VLO 10 image,
        [note: if a new prefix image is not being added, encoding of new "dataset" starts here]

the previous dataset,
the previous length marker,
the previous length-of-dataset,
the previous length-of-prefix=−1
the previous other legible data (source, copyright, . . . ), which is optional,
[note: encoding of new "dataset" ends here]
the new length marker,
the new length-of-dataset,
the new length-of-prefix (0 if no prefix image is now being added),
the hew filename of the decoder for this level,
the source for the decoder for this level, and
new other legible data (agent, server, . . . ), which is optional.

It must be noted that, for any level of encapsulation, the encapsulator need not have, and in fact may not be permitted access to, the original or previous encoding method. Therefore, for example, a carrier or a subscription service may not be able to legally to open the earlier-stage VLO 10 and a VLO 10 may, of course, be passed on as it came in, or as it came in with additional legible data appended at the end. In this regard, however, and even if an intermediate agent does have decoding privileges for an incoming VLO 10, so that the VLO 10 can be taken apart and rearranged, its image modified, keys added, changed, or deleted, and other modifications made, the agent is in effect creating a new VLO 10 based in some part on the received VLO 10.

Next considering the decoder, or "unwrapper", in general such a decoder will execute the following procedure:

START next level: searching backward from end of file, find last length-marker and interpret prefix image length
　If prefix-image-length is not −1
　　If decoder not NULL and decoder not resident
　　　Try to fetch decoder [may require user's participation if permission needs to be bought or otherwise obtained]
　　　If failure in obtaining decoder
　　　Abort unwrapping, declare an exception
　Unwrap:
　　Discard prefix image if any
　　If decoder not NULL
　　　Decode encoded part,
　　Discard the from just-used length marker to the end
　　If prefix-image-length>0
　　　Discard prefix image
　go back to START next level of unwrapping
　(else: finished retrieving original VLO)

It should be noted that the decoder may retain the parts otherwise thrown away, that is, the history of decoders used and the various levels of additional images and/or legible data at the end.

9. Alternate Implementation of VLO 10 Multi-Level Encapsulation With Alternate Form of VLO 10 (FIGS. 11A, 11B, 11C and 11D)

The above described methods for multiple level encapsulation may be modified to allow additions to be made to a VLO 10 at each successive encapsulation, and to allow each successive encapsulation to be a self-contained process doing its own re-scrambling, by a modification to the Postscript 16, Length Field 14Ea and Marker 14Eb elements of the VLO 10 structure described herein above. In particular, and as illustrated in FIGS. 11A through 11D which illustrate encapsulation using the modified VLO 10 structure, and will be understood to illustrate the multi-level encapsulation of a VLO 10 as structured in FIG. 1 and as discussed above, with allowance for the difference in the structure of Postscript 16. As shown in FIGS. 11A through 11D, the VLO 10 structure is modified to be comprised of:

an Image 12,
an Appendix 14
a Postscript 16 including an Appendix_Length 16A, followed by, as options, an Encapsulation Type 16B, a Decoder ID 16C, a Decoder Source 16D, a copyright notice, and so on, and concluded by an Insert_Length 16E, and
a Postscript_Length 16F.

It will be noted that the Postscript 16 uniformly begins with the Appendix Length 16A and ends with an Insert_Length 16E, which describes the length of any material added to the VLO 10. It will also be noted that these fields, together with the Postscript Length 16F, are held in fixed-length fields, and that the Postscipt Length 16F field points to the location of the Appendix Length 16A field, so that Appendix 14 is no longer required to contain a Marker 14Eb to indicate the location of the Appendix Length 16A field. The elimination of the Marker 14Eb field thereby avoids potential decoding errors arising from mistaken interpretation of a sequence of the dataset or image as a Marker 14Eb.

This alternate VLO 10 structure permits levels of encoding wherein each successive encapsulation makes its own additions and doing its own re-scrambling. The additions that may, for example, be made to the VLO 10 during encapsulation include miscellaneous data to be included in the encoded region, miscellaneous data to be left in the clear, the identity of the corresponding decoder, e.g. "NWdecode.dll", the source from which the decoder can be gotten, e.g. "www.netwaveinc.com", and so on.

As described above, the encapsulated form may, but need not, start with a new Image 12'. In those instances wherein a new Image 12' is superimposed at the start of the VLO 10, the original Image 12 becomes a components of the encoded region, that is, effectively part of the Appendix 14, to be recovered and restored by the corresponding decoding of the encapsulated VLO 10.

Considering the encapsulation of VLOs 10 of the alternate structure, as illustrated in FIGS. 11A through 11D, the modified form of Postscript 16 includes:

an Appendix Length 16A,
Encapsulation Type 16B, wherein 0=original VLO, 1=encapsulated with previous Image 12, 2=encapsulated with a new Image 12),
a Decoder ID 16C,
a Decoder source 16D,
optional: Miscellaneous Data 16G in the clear, that is, not encoded,
optional: an Insertion 16H inserted by the person or program presently encapsulating the VLO 10, and
Insert Length 16E (0 is there's no insertion)

The person or program presently encapsulating the VLO 10 has the options of including a new Image 12' at the beginning and new material, to be encoded and or not encoded. The previous Appendix 14, previous Postscript 16 and its length become the new Appendix 14, as illustrated in FIGS. 11. If new material is pre-inserted in the Postscript 16, so that it is encoded, two further changes are required. First, the length of this new material becomes the "insert length" and second the postscript length is augmented by this same amount. It should be noted that these two sections, that is, the insertion and its length and the postscript length, may be interchanged in order, and corresponding alterations made in the methods The encapsulated VLO 10 has two possible forms, depending on whether or not a new Image 12' is pre-appended. When the previous Image 12 is used, the resulting new VLO 10 using the previous Image 12 is comprised of the previous image, a new appendix, comprised of the encoded previous appendix, previous postscript, possibly with a new insertion, and the previous postscript length, which is augmented if there is an insertion, and a new postscript, comprised of the new appendix length, the encapsulation type, which is 1 for "encapsulated VLO 10 with previous image", the decoder ID for this encapsulation, the decoder's web site source, optional miscellaneous other new unencoded material, and an insertion length, and a new postscript length.

An encapsulated VLO 10 that contains a new image is in turn comprised of the new image, a new appendix, comprised of the previous image, the previous appendix, the previous postscript, possibly with a new insertion, the previous postscript length, augmented if there is an insertion, and a new postscript, comprised of the new appendix length, the encapsulation type, such as 2 for "encapsulated VLO with new image", the decoder ID for the current encapsulation, the decoder's web site source, optional miscellaneous other new unencoded material, and an insertion length, and a new postscript length.

The decoding of a VLO 10 is the comprised of the progressive stripping of each level of encapsulation, one level at a time, wherein the stripping one level of encapsulation of a VLO 10 is comprised of the steps of:

getting the postscript length, and
jumping back to the beginning of the postscript and interpreting:
appendix length,
encapsulation type,
decoder ID,
decoder source,
if encapsulation type is "unencapsulated",
and if the needed decoder=NULL
then the VLO is already completely decoded,
and it can only be decoded, yielding the original VLO 10
if decoder is not present, the get it from the web site source
decode the appendix
and mark the required decoder NULL
else strip one level of encapsulation by:
if decoder not present, get it from the web site source,
decode the appendix,
set aside the already-used postscript,
if encapsulation type was "encapsulated with new image"
strip the image (leaving only the decoded appendix)
if the insertion length of the VLO thus recovered>0:
remove insertion & adjust postscript length accordingly.

Note that the last step of removing the insertion is necessary for proper subsequent de-encapsulation as the previous VLO 10 must be completely returned exactly to its previous state, which includes recovering exactly the previous postscript, because this earlier form of the postscript may have been involved in computing the checksum of the earlier-stage encoding.

The decoding of a VLO 10 is preferably implemented by an automatic procedure for determining whether it is fully decoded, and if not, choosing the appropriate decoder, for the next step of unscrambling but, if the decoder is not present or not usable, either fetching the decoder automatically over the net, or stating to the user what is required by way of, for example, passwords or payments, wherein failure to complete any step results in an explanation to the user.

It will be appreciated that the decoding of a properly multi-encapsulated VLO 10 is therefore embodied as a regular, and programmable, procedure that involves the automatable steps of identifying, and fetching if necessary, the required decoder, the use of this decoder, and the automatic stripping out of an insertion, if present, so that subsequent decoding will be successfully completed.

Finally, while the invention has been particularly shown and described with reference to preferred embodiments of the apparatus and methods thereof, it will be also understood by those of ordinary skill in the art that various changes, variations and modifications in form, details and implementation may be made therein without departing from the spirit and scope of the invention as defined by the appended claims. Therefore, it is the object of the appended claims to cover all such variation and modifications of the invention as come within the true spirit and scope of the invention.

What is claimed is:

1. A method for executing Internet based electronic commerce business transactions, comprising the steps of:

in a vendor system connected to the Internet and associated with a vendor offering a business transaction,
creating a visual link object representing a business transaction, wherein
a visual link object is a single self-contained entity and includes, as integral parts of the visual link object,
a displayable image residing at the start of the visual link object and representing a business transaction,
an appendix residing in the visual link object following the display image and containing information relating to the business transaction, including an encoded data block containing information relating to the business transaction sufficient for a buyer to complete the business transaction represented by the visual link object, whereby
the business transaction may be completed by a buyer independently of the vendor system, and
a postscript residing near the end of the visual link object and containing information relating to the visual link object, and
communicating the visual link object representing the business transaction to a distributor system connected to the Internet and associated with a distributor presenting business transactions represented by visual link object to potential buyers,
in the distributor system,
communicating the visual link object representing the business transaction to a buyer system associated with a potential buyer, and
in the buyer system,
accessing the contents of the visual link object to recover the information residing in the appendix relating to the business transaction.

2. The method for executing Internet based electronic commerce business transactions of claim 1, further comprising the step of:

in the buyer system,
  performing actions represented in the information residing in the appendix and relating to the business transaction that are necessary to complete the business transaction.

3. The method for executing Internet based electronic commerce business transactions of claim 1, wherein:
  the information relating to the business transaction and sufficient for a buyer to complete the business transaction represented by the visual link object residing in the appendix directly includes all information necessary for a buyer to complete the business transaction.

4. The method for executing Internet based electronic commerce business transactions of claim 1, wherein:
  the information relating to the business transaction and sufficient for a buyer to complete the business transaction represented by the visual link object residing in the appendix includes information represented by links to other systems connected to the Internet and accessible to the buyer system.

5. The method for executing Internet based electronic commerce business transactions of claim 1, wherein the step of communicating the visual link object representing the business transaction to a buyer system is comprised of the step of:
  displaying the visual link object in the distributor system through an HTML page accessible to the buyer system.

6. The method for executing Internet based electronic commerce business transactions of claim 1, wherein the step of communicating the visual link object representing the business transaction to a buyer system is comprised of the step of:
  broadcast transmitting of the visual link object to the buyer system upon accessing of the distributor system by the buyer system.

7. The method for executing Internet based electronic commerce business transactions of claim 6, wherein the step of communicating the visual link object representing the business transaction to a buyer system by broadcast transmitting of the visual link object to the buyer system upon accessing of the distributor system by the buyer system is performed in conjunction with a transmission of other information from the distributor system to the buyer system that is requested by a user of the buyer system.

8. The method for executing Internet based electronic commerce business transactions of claim 1, wherein the step of communicating the visual link object representing the business transaction to a buyer system is comprised of the step of:
  communicating the visual link object to a referrer system, and
  transmitting the visual link object from the referrer system to the buyer system within an electronic mail message transmitted from the referrer system to the buyer system.

9. The method for executing Internet based electronic commerce business transactions of claim 1, wherein the step of communicating the visual link object representing the business transaction to a distributor system connected to the Internet and associated with a distributor presenting business transactions represented by visual link objects to potential buyers includes the steps of:
  communicating the visual link object to the distributor system through at least one intermediate system, and
  in an intermediate system,
    inserting into the visual link object additional information relating to the intermediate system.

10. The method for executing Internet based electronic commerce business transactions of claim 9, wherein the step of inserting into the visual link object additional information relating to the intermediate system in which the additional information is inserted into the visual link object includes the steps of:
  encoding the appendix and postscript of the visual link object, and
  appending the displayable image of the visual link object to the start of the encoded appendix and postscript of the visual link object and appending a new postscript to the end of the encoded appendix and postscript of the visual link object to create an encapsulated version of the visual link object.

11. The method for executing Internet based electronic commerce business transactions of claim 9, wherein the step of inserting into the visual link object additional information relating to the intermediate system in which the additional information is inserted into the visual link object includes the steps of:
  encoding the displayable image, appendix and postscript of the visual link object, and
  appending a new displayable image to the start of the encoded displayable image, appendix and postscript of the visual link object and appending a new postscript to the end of the encoded displayable image, appendix and postscript of the visual link object to create an encapsulated version of the visual link object.

12. The method for executing Internet based electronic commerce business transactions of claim 9, wherein the additional information inserted into the visual link object comprises tracking information relating to the communication of the visual link object through the at least one intermediate system.

13. The method for executing Internet based electronic commerce business transactions of claim 9, wherein the additional information inserted into the visual link object comprises information relating to commercial activities of the at least one intermediate system.

\* \* \* \* \*